US010464246B2

(12) United States Patent
Nobuta et al.

(10) Patent No.: US 10,464,246 B2
(45) Date of Patent: Nov. 5, 2019

(54) INJECTION MOLDING METHOD

(71) Applicants: U-MHI PLATECH CO., LTD., Nagoya-shi, Aichi (JP); MITSUBISHI HEAVY INDUSTRIES, LTD., Tokyo (JP)

(72) Inventors: Munehiro Nobuta, Nagoya (JP); Naoki Toda, Nagoya (JP); Toshihiko Kariya, Nagoya (JP); Takeshi Yamaguchi, Nagoya (JP); Kiyoshi Kinoshita, Nagoya (JP)

(73) Assignees: U-MHI PLATECH CO., LTD., Nagoya-Shi, Aichi (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 272 days.

(21) Appl. No.: 15/113,669

(22) PCT Filed: Apr. 20, 2015

(86) PCT No.: PCT/JP2015/002147
§ 371 (c)(1),
(2) Date: Jul. 22, 2016

(87) PCT Pub. No.: WO2016/075846
PCT Pub. Date: May 19, 2016

(65) Prior Publication Data
US 2017/0001354 A1  Jan. 5, 2017

(30) Foreign Application Priority Data
Nov. 14, 2014  (JP) ................................ 2014-231277

(51) Int. Cl.
*B29C 45/50* (2006.01)
*B29C 45/76* (2006.01)
(Continued)

(52) U.S. Cl.
CPC .......... *B29C 45/50* (2013.01); *B29C 45/0005* (2013.01); *B29C 45/76* (2013.01);
(Continued)

(58) Field of Classification Search
CPC .. B29C 45/0005; B29C 45/50; B29K 2105/12
See application file for complete search history.

(56) References Cited

U.S. PATENT DOCUMENTS

2005/0161847 A1* 7/2005 Weatherall ............. B29C 45/77
264/40.1
2011/0165424 A1* 7/2011 Mortazavi ............. B29C 43/203
428/426
(Continued)

FOREIGN PATENT DOCUMENTS

CN   102189638 A   9/2011
JP   S58-197029 A  11/1983
(Continued)

OTHER PUBLICATIONS

China Patent Office, "Office Action for Chinese Patent Application No. 201580005334.0," dated Jan. 25, 2017.
(Continued)

*Primary Examiner* — Tabatha L Penny
(74) *Attorney, Agent, or Firm* — Manabu Kanesaka; Benjamin Hauptman; Kenneth Berner

(57) ABSTRACT

An injection molding method includes: a plasticizing process of feeding a resin pellet and additive components to a heating cylinder including a screw that can rotate around a rotation axis and can advance and retreat along the rotation axis, and generating molten resin by rotating the screw in a normal direction; and an injection process of injecting to a cavity the molten resin containing the additive components. In the plasticizing process, retreat operation of forcibly
(Continued)

retreating the screw is performed at a predetermined velocity by a predetermined stroke or a predetermined time.

17 Claims, 15 Drawing Sheets

(51) Int. Cl.
*B29C 45/00* (2006.01)
*B29K 105/12* (2006.01)

(52) U.S. Cl.
CPC .............. *B29C 2945/76568* (2013.01); *B29C 2945/76598* (2013.01); *B29C 2945/76605* (2013.01); *B29C 2945/76665* (2013.01); *B29C 2945/76846* (2013.01); *B29K 2105/12* (2013.01)

(56) References Cited

U.S. PATENT DOCUMENTS

| | | | |
|---|---|---|---|
| 2011/0215496 A1 | 9/2011 | Ogura et al. | |
| 2013/0072624 A1* | 3/2013 | Kariya | B29C 45/0005 524/570 |
| 2013/0200552 A1* | 8/2013 | Kariya | B29C 45/60 264/328.17 |
| 2016/0001477 A1* | 1/2016 | Okabe | B29C 45/0005 264/328.14 |
| 2016/0009010 A1* | 1/2016 | Kariya | B29C 45/1816 264/328.18 |
| 2017/0001353 A1* | 1/2017 | Kariya | B29C 45/47 |
| 2017/0015036 A1* | 1/2017 | Kariya | B29C 45/0005 |

FOREIGN PATENT DOCUMENTS

| | | | |
|---|---|---|---|
| JP | S59-109335 A | 6/1984 | |
| JP | S60-135224 A | 7/1985 | |
| JP | S62-270312 A | 11/1987 | |
| JP | H05-25650 B2 | 4/1993 | |
| JP | H06-198688 A | 7/1994 | |
| JP | H08-197596 A | 8/1996 | |
| JP | H09-254206 A | 9/1997 | |
| JP | H11-19987 A | 1/1999 | |
| JP | H11-138601 A | 5/1999 | |
| JP | 2001-191374 A | 7/2001 | |
| JP | 2006-327127 A | 12/2006 | |
| JP | 2007-007864 A | 1/2007 | |
| JP | 2008-006697 A | 1/2008 | |
| JP | 2008006697 | * | 1/2008 |
| JP | 2012-056173 A | 3/2012 | |
| JP | 2012-511445 A | 5/2012 | |
| WO | 2014/155409 A1 | 10/2014 | |
| WO | 2014/170932 A1 | 10/2014 | |

OTHER PUBLICATIONS

PCT, "International Search Report for International Application No. PCT/JP2015/002147".

PCT/ISA/237, "Written Opinion of the International Searching Authority for International Application No. PCT/JP2015/002147," dated Jul. 21, 2015.

PCT/IB/338, "Notification of Transmittal of Copies of Translation of the International Preliminary Report on Patentability for International Application No. PCT/JP2015/002147," dated May 26, 2017.

PCT/IB/373, "International Preliminary Report on Patentability for International Application No. PCT/JP2015/002147," dated May 16, 2017.

Europe Patent Office, "Search Report for European Patent Application No. 15858255.1," dated Apr. 3, 2017.

Japan Patent Office, "Notice of Reason for Rejection for Japanese Patent Application No. 2015-536701," dated Nov. 18, 2015.

* cited by examiner

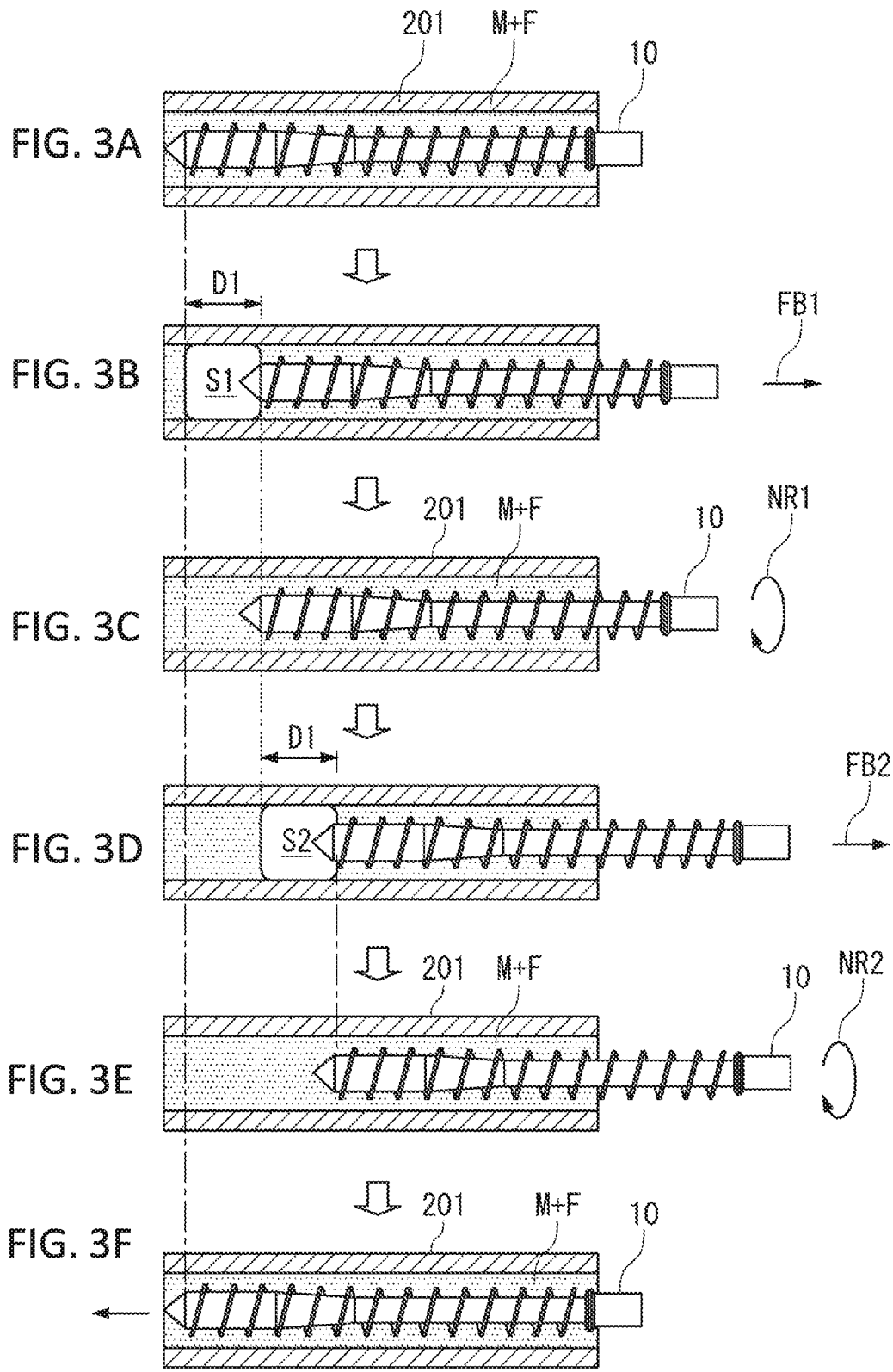

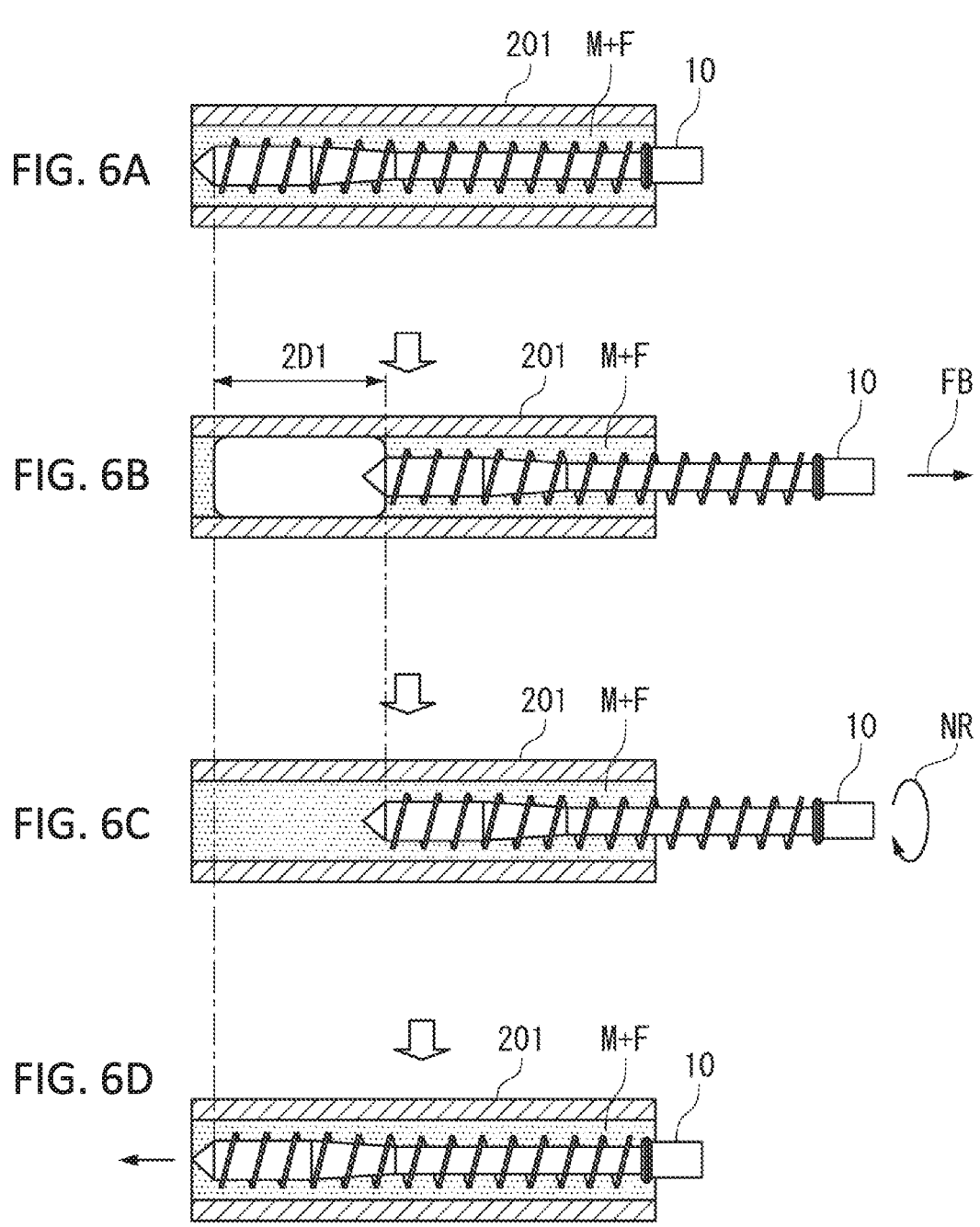

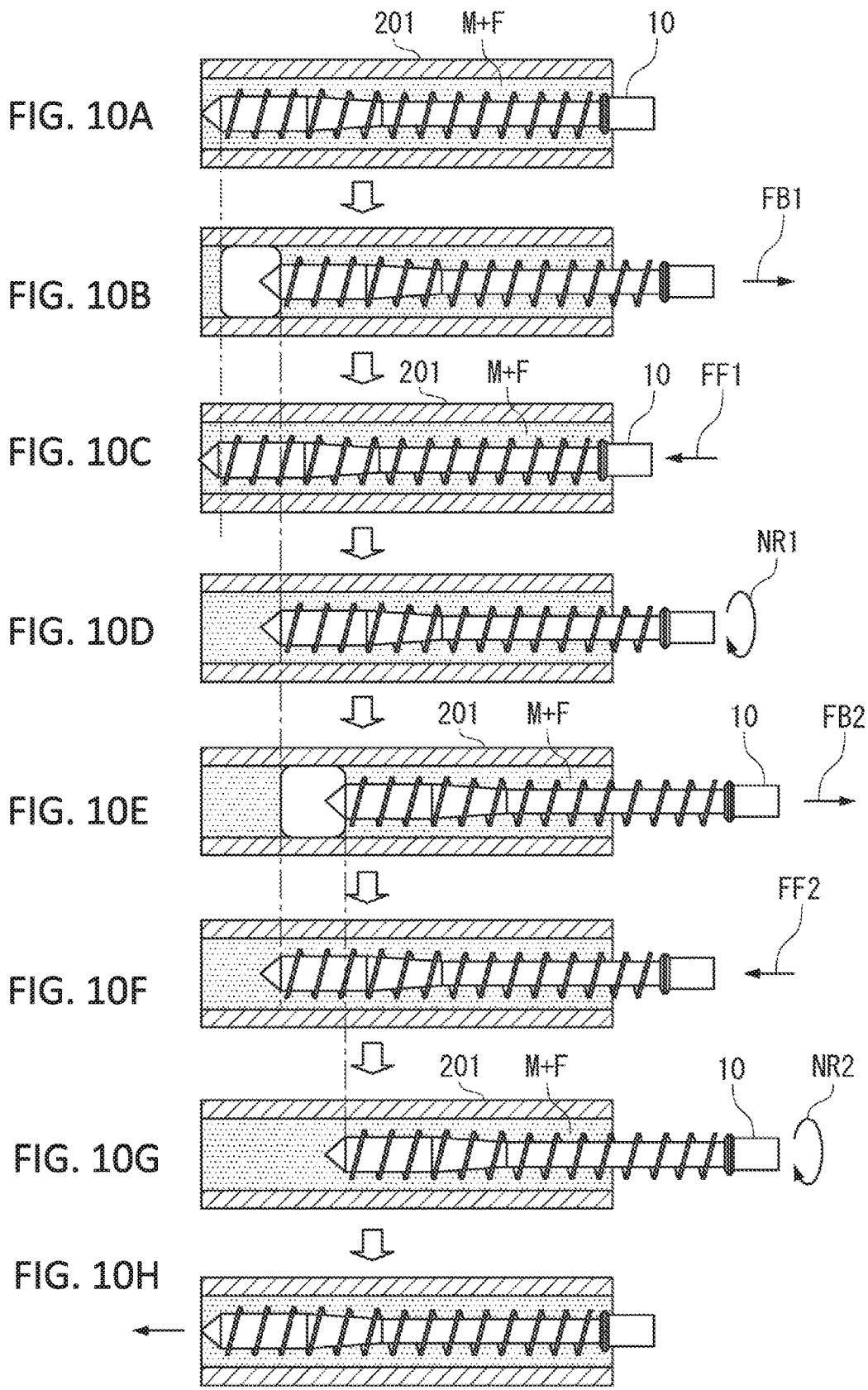

INJECTION MOLDING METHOD

RELATED APPLICATIONS

The present application is National Phase of International Application No. PCT/JP2015/002147 filed Apr. 20, 2015, and claims priority from Japanese Application No. 2014-231277, filed Nov. 14, 2014, the disclosure of which is hereby incorporated by reference herein in its entirety.

TECHNICAL FIELD

The present invention relates to injection molding of resin containing additive components.

BACKGROUND ART

There have been used for various applications high-value-added molded products in which strength, functions, etc. have been enhanced by making them contain additive components. As a technique to obtain the molded product by injection molding, a technique has been known in which thermoplastic resin is melted by rotation of a screw in a cylinder serving as a plasticizing device, additive components are mixed in or kneaded with the melted thermoplastic resin, and subsequently, the thermoplastic resin is injected into a mold of an injection molding machine.

In a case where additive components, such as an additive agent and a filling material are mixed in and kneaded with thermoplastic resin, and where injection molding of a desired molded product is performed, usually, a masterbatch pellet containing the additive components is manufactured by a biaxial extrusion molding machine, and subsequently, the masterbatch pellet is put in an injection molding machine together with desired thermoplastic resin to then manufacture a predetermined molded product. In this method, although resin mixing can be performed only by a common injection molding machine, raw material cost becomes high since an expensive masterbatch is used as a raw material. For this reason, there has been proposed a raw material direct feed type injection molding machine that can directly feed additive components and can skip a pellet manufacturing process.

However, since distributive mixing and dispersive mixing of the additive components into the thermoplastic resin are insufficient in the raw material direct feed type injection molding machine, an injection molding machine improved in the insufficiency has been proposed (Patent Literature 1).

In addition, in order to obtain an effect of improving strength particularly by reinforcing fibers among additive components, the reinforcing fibers are desired to be uniformly dispersed in resin. Particularly, in a case where reinforcing fibers, which are the fibers in a chopped strand state (hereinafter referred to as chopped fibers) where the fibers have been previously chopped to have a predetermined length or which are the fibers in a so-called roving state (hereinafter referred to as roving fibers), and whose fiber length is not less than 3 mm, and a resin raw material are fed to a cylinder, respectively instead of using a reinforcing fiber pellet obtained by impregnating the resin raw material in the reinforcing fibers, the fibers are easily tangled in a screw, and it is not easy to open a fiber bundle, which is a set of the reinforcing fibers, and to disperse the fibers in the resin. For this reason, although an extremely large shear force and shear amount may just be given using a biaxial extruder in order to achieve uniform dispersion of the additive components, the biaxial extruder is extremely expensive, handling of molding condition selection, maintenance, etc. is complicated, and thus molding is not easy (Patent Literature 1 and Patent Literature 2). In addition, although a mechanism (a feeder) that forcibly feeds the reinforcing fibers inside the cylinder is also provided in order to contribute to uniform dispersion of the reinforcing fibers (for example, Patent Literature 3), a bundle of the reinforcing fibers or a bundle (hereinafter, collectively referred to as the bundle) has not been eliminated yet. Particularly, in a case where a contained amount of the reinforcing fibers is high, i.e. not less than 10%, it is difficult to uniformly disperse the reinforcing fibers in the resin.

CITATION LIST

Patent Literature

Patent Literature 1: Japanese Patent Laid-Open No. 2007-7864
Patent Literature 2: Japanese Patent Laid-Open No. 2012-56173
Patent Literature 3: National Publication of International Patent Application No. 2012-511445

SUMMARY OF INVENTION

Technical Problem

The present invention aims to providing an injection molding method of resin containing additive components, such as reinforcing fibers that can easily eliminate uneven distribution of the additive components, particularly the reinforcing fibers, using a simple uniaxial plasticizing screw, in generation of molten resin that feeds to a cylinder additive components, particularly reinforcing fibers with a fiber length of not less than 3 mm, and a resin raw material.

In addition, the present invention aims to provide an injection molding apparatus that achieves such an injection molding method.

Solution to Problem

The present inventors examined a cause of occurrence of uneven distribution particularly in reinforcing fibers in which the uneven distribution tends to occur most commonly among additive components, and obtained one conclusion. That is, during a plasticizing process of injection molding, as shown in FIG. 14C, a fiber bundle, which is a set of a number of reinforcing fibers F, and molten resin M are present in a screw groove 301 between flights 306 of a screw 300 for injection molding arranged inside a cylinder 310, the fiber bundle and the molten resin M being separated into a pull side 303 and a push side 305 of the flight. Since a viscosity of the molten resin M is relatively high, and the molten resin M cannot get into the fiber bundle, a shear force by rotation of the screw 300 through a medium of the molten resin M is not transmitted to an inside of the fiber bundle, and opening of the fiber bundle does not proceed. Accordingly, since the reinforcing fibers F are injection-molded while remaining as the fiber bundle, they are unevenly distributed in a molded product. Note that a white arrow of FIG. 14A shows a direction in which the screw 300 rotates (it is set to be normal rotation), and that white arrows of FIG. 14C show relative moving directions of the screw 300 and the cylinder 310 in an axial direction or in a peripheral direction along with the rotation of the screw 300. The same applies to an embodiment, which will be mentioned later. In addition, in the present invention, in the plasticizing process, a direction in which a screw is rotated in order to melt a resin raw material and to convey it to a tip side of the screw is set to be the normal rotation.

Consequently, the present inventors have conceived of an idea in which a swirling flow is generated in the molten resin M inside the screw groove 301 in a direction different from a direction caused by the normal rotation of the screw, a shear force associated with a flow of the molten resin M is made to act on the fiber bundle in addition to a shear force caused by the normal rotation of the screw, and thereby opening of the fiber bundle is promoted.

Namely, an injection molding method of a resin composition containing additive components of the present invention includes: a plasticizing process of feeding a resin raw material and the additive components, such as reinforcing fibers to a cylinder including a screw that can rotate around a rotation axis and can advance and retreat along the rotation axis, and generating molten resin by rotating the screw in a normal direction; and an injection process of injecting the molten resin containing the additive components such as reinforcing fibers toward a cavity by advancing the screw. In the injection molding method, in the plasticizing process, a shear force in a direction different from a direction of a shear force generated by the rotation of the screw is applied to the additive components contained in the molten resin inside a groove of the screw to thereby promote dispersion of the additive components.

In the present invention, the additive components can be set to be the reinforcing fibers.

Usually, at the time of the plasticizing process, only the shear force in a rotation (a normal rotation) direction of the screw is mainly applied to a fiber bundle of the reinforcing fibers in the screw groove. However, as described above, since the shear force in the direction different from the shear force by the rotation of the screw for plasticization can be given to the fiber bundle, a mixing or kneading action given to the fiber bundle is increased. In addition, since a temperature of the molten resin rises, and a viscosity thereof is lowered due to shear heat generation by the shear force, the molten resin can enter fiber bundles inside the fiber bundle to promote opening of the fiber bundle, and dispersion of the reinforcing fibers in the molten resin can be promoted.

In the present invention, a swirling flow can be generated in the molten resin containing the reinforcing fibers in a rotation axis direction of the screw, and a velocity of the swirling flow is preferably set to be not less than either smaller one of 5 (mm/s) or 0.05×D (mm/s) (D is a cylinder inner diameter). The swirling flow can be generated by a retreat operation of forcibly retreating the screw.

By the way, usually, when the screw is forcibly retreated in the plasticizing process, only a slight back pressure is applied to the molten resin during measurement, a mixing or kneading effect by the back pressure is small, and thus poor dispersion of the reinforcing fibers fed as the raw material easily occurs. In addition, an amount of the shear force applied to the fiber bundle in order to disperse the fiber bundle of the reinforcing fibers is largely affected by a length of the screw passed through until the molten resin containing the reinforcing fibers is discharged from the screw after the reinforcing fibers are fed to the screw, a so-called effective screw length. For this reason, it is generally considered that forcibly retreating the screw to perform plasticization in a state where the effective screw length is short causes insufficiency of the shear force applied to the fiber bundle to thereby result in occurrence of poor fiber opening.

However, as a result of earnestly having studied a method of applying the shear force to the fiber bundle besides the shear force applied to the fiber bundle while the screw is rotating, the present inventors have conceived of a method of making it possible to promote dispersion even in the reinforcing fibers with the fiber length of not less than 3 mm by applying the shear force in the direction different from the rotation direction of the screw by forcible retreat of the screw conventionally considered to have an opposite effect on fiber dispersion.

In the present invention, as a retreat operation, the screw can be forcibly retreated by a predetermined stroke or a predetermined time.

In the present invention, the retreat operation can be performed, and a rotation operation of rotating the screw in the normal direction can be performed after the retreat operation.

In this case, the retreat operation and the rotation operation can be alternately repeated.

In addition, in a case where the retreat operation and the rotation operation are alternately repeated, the following retreat operation can be performed after it is detected that a space in which molten resin is not present has been filled with the molten resin by performing the rotation operation, the space having been formed in front of the screw by performing the preceding retreat operation.

As the above rotation operation, the screw can be rotated while a position of the screw in the rotation axis direction is maintained or while the screw is advanced.

In addition, in this case, a force in an advance direction can be applied to the molten resin after the space is filled with the molten resin. Specifically, the force in the advance direction can be applied by applying to the screw the force in the advance direction, or the force in the advance direction can be applied by rotating the screw in the normal direction to thereby convey the molten resin in the advance direction.

Further, the screw is rotated in the normal direction to thereby convey the molten resin in the advance direction while being moved backward in the axial direction based on a pressure of the molten resin, and thereby also the force in the advance direction can be applied.

In the present invention, the retreat operation can be performed, and an advance operation of forcibly advancing the screw can be performed by a predetermined stroke or a predetermined time, or until it is detected that the pressure of the molten resin has reached a predetermined pressure after the retreat operation is performed. The rotation operation of rotating the screw in the normal direction can be performed after the advance operation.

In this case, the retreat operation, the advance operation, and the rotation operation are alternately repeated, and the rotation operation can be performed after the retreat operation or the advance operation.

In this case, such an advance operation may be employed that an advance distance or an advance time of the advance operation is shorter than a retreat distance or a retreat time of the retreat operation.

In addition, in the retreat operation of the present invention, the screw can be forcibly retreated continuously or intermittently by dividing a predetermined stroke or a predetermined time.

In addition, the retreat operation of the present invention can be continued until it reaches at least a predetermined retreat velocity or a predetermined retreat force. In this case, a time and a distance until the retreat operation reaches the predetermined retreat velocity from start of the retreat can be controlled to be not less than predetermined values, or acceleration can be controlled to be not less than a predetermined value. In addition, the retreat operation continued until it reaches at least the predetermined retreat velocity or the predetermined retreat force is performed continuously or intermittently, and thereby the screw can be forcibly retreated. In addition, in retreat control after the retreat operation reaches the predetermined retreat velocity or the predetermined retreat force, the retreat operation may be ended simultaneously with the reaching or may be continued while maintaining the predetermined retreat velocity or the predetermined retreat force after the reaching, or control may be performed so that the retreat velocity is further increased or the retreat force is further increased after the reaching.

The acceleration of the retreat operation can be set to be not less than 5 (mm/s$^2$). In addition, the predetermined stroke can be set to be not less than either smaller one of 10 (mm) and 0.1×D (mm).

In addition, in the advance operation of the present invention, the screw can be forcibly advanced continuously or intermittently by dividing a predetermined stroke or a predetermined time.

In the present invention, the resin raw material can be fed from a feed hole of an upstream side of the cylinder, and the additive components can be fed from a feed hole of a downstream side thereof. In addition, the additive components and the resin raw material can also be fed from the same (common) feed hole of the cylinder.

In the present invention, the fiber length of the reinforcing fibers can be set to be not less than 3 mm. In addition, in the present invention, a content rate of the reinforcing fibers contained in the molten resin is preferably set to be 10 to 70%, and is more preferably set to be 15 to 50%.

The present invention provides an injection molding machine that executes the above injection molding method. That is, the present invention is an injection molding machine that includes: a cylinder in which a discharge nozzle is provided on a front side, and that includes an additive component feed hole through which additive components are fed; a screw provided inside the cylinder so as to be able to rotate around a rotation axis and to be able to advance and retreat along the rotation axis; and a control unit having a control program that controls an operation of the screw, and that gives a shear force to the additive components fed to the cylinder by rotating the screw in a normal direction to thereby generate and plasticize molten resin. In the injection molding machine, in the plasticization, the control unit has the control program that forcibly retreats the screw, and a retreat operation velocity input setting unit that can set a retreat velocity of the screw to be an arbitrary value.

The injection molding machine of the present invention can appropriately execute various specific embodiments of the plasticizing process in the above-mentioned injection molding method of the present invention.

In addition, the present invention is a control device of an injection molding machine that gives a shear force to additive components fed to a cylinder by rotating in a normal direction a screw inserted into the cylinder included in a plasticizing device of the injection molding machine, and controls a plasticizing operation of generating molten resin. In the plasticizing operation, the control device has a control program that forcibly retreats the screw, and a retreat operation velocity input setting unit that sets a retreat velocity of the screw to be an arbitrary value.

Advantageous Effect of Invention

According to the present invention, there can be provided the injection molding method and the injection molding machine that can eliminate uneven distribution of the additive components including the reinforcing fibers also in generation of the molten resin in which the additive components, particularly the reinforcing fibers, and the resin raw material are fed to the cylinder using the simple uniaxial plasticizing screw.

BRIEF DESCRIPTION OF DRAWINGS

FIG. 2A shows the molten state at the time of plasticization start; FIG. 2B at the time of plasticization completion; and FIG. 3C at the time of injection completion.

FIGS. 3A to 3F are views showing operations of a screw according to the embodiment after the plasticization start: FIG. 3A is the view showing a state of the plasticization start; FIG. 3B a state where preceding forcible retreat of the screw is ended; FIG. 3C a state where the preceding forcible retreat is ended and where the screw rotates in a normal direction; FIG. 3D a state where subsequent forcible retreat of the screw is ended; FIG. 3E a state where the subsequent forcible retreat is ended and where the screw rotates in the normal direction; and FIG. 3F a state where the screw is advanced to thereby complete injection.

FIGS. 4A to 4D are plan views showing a shear force added to reinforcing fibers in a screw groove: FIGS. 4A and 4B show the shear force at the time of rotation (normal rotation) of the screw; and FIGS. 4C and 4D at the time of forcible retreat of the screw.

FIG. 5A is a transverse view showing a flow of molten resin generated in the screw groove by the normal rotation, FIG. 5B is a longitudinal view showing a flow of the molten resin generated in the screw groove by forcible retreat, FIG. 5C is a longitudinal cross-sectional view showing velocity distribution of the molten resin in a case of FIG. 5A, and FIG. 5D is a longitudinal cross-sectional view showing velocity distribution of the molten resin in a case of FIG. 5B.

FIGS. 6A to 6D are views showing an example in which the screw is continuously forcibly retreated by a predetermined stroke.

FIGS. 10A to 10H are views showing procedures of a plasticizing process in which forcible advance is combined with forcible retreat.

FIG. 11A is a transverse view showing a flow of molten resin generated in the screw groove by the normal rotation, FIG. 11B is a longitudinal view showing a flow of the molten resin generated in the screw groove by the forcible advance, FIG. 11C is a longitudinal cross-sectional view showing velocity distribution of the molten resin in a case of FIG. 11A, and FIG. 11D is a longitudinal cross-sectional view showing velocity distribution of the molten resin in a case of FIG. 11B.

FIG. 14A is a side view showing a portion of a second stage; FIG. 14B is a cross-sectional view showing a screw groove formed by flights, and a vicinity of the screw groove; and FIG. 14C is a cross-sectional view schematically showing that a bundle of reinforcing fibers and a bundle of molten resin are separately present inside the screw groove.

DESCRIPTION OF EMBODIMENT

Hereinafter, the present invention will be explained in detail based on an embodiment shown in accompanying drawings.

Figure 1:
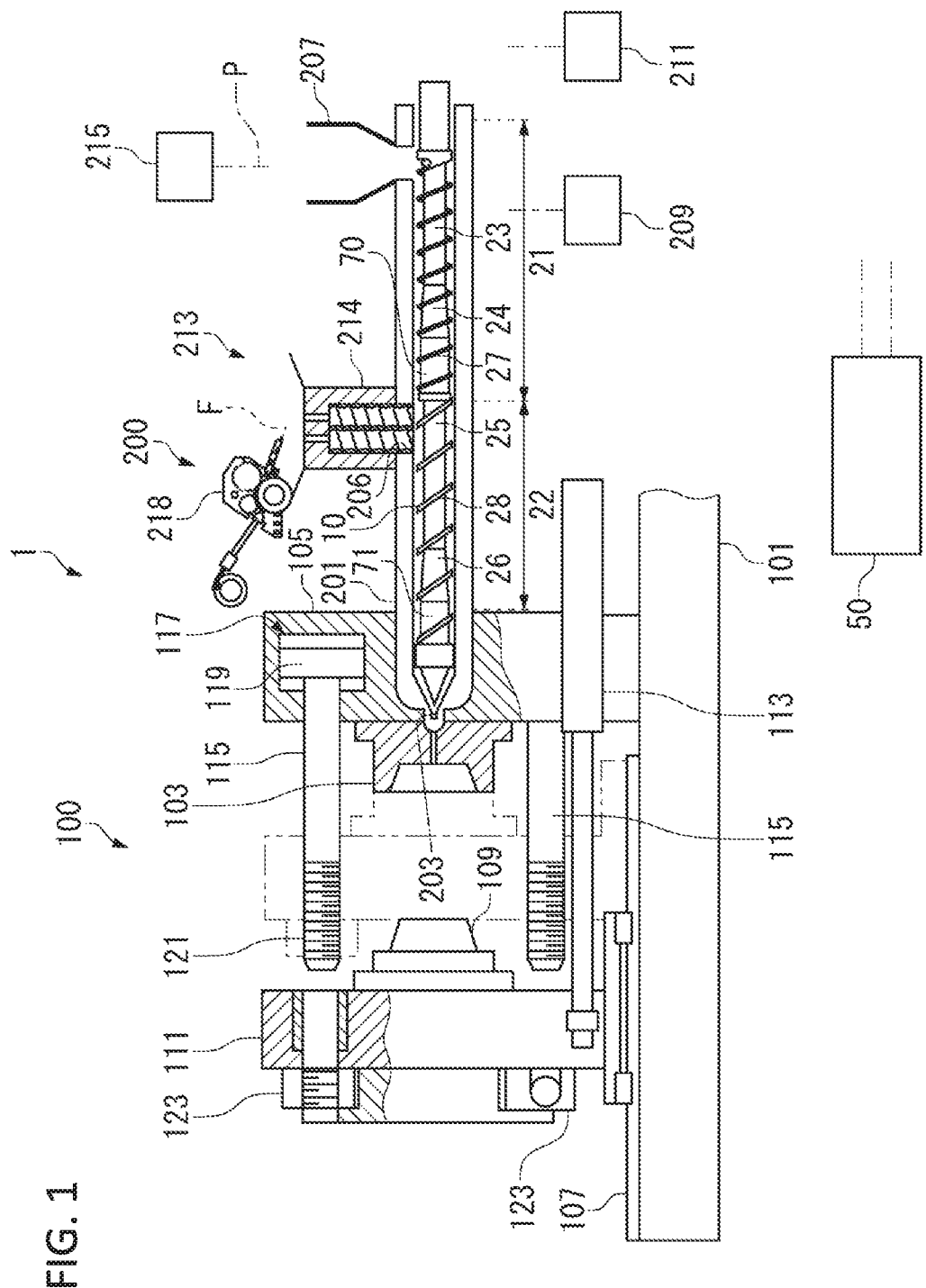
FIG. 1 is a view showing a schematic configuration of an injection molding machine according to the embodiment.

An injection molding machine 1 according to the embodiment, as shown in FIG. 1, includes: a mold clamping unit 100; a plasticizing unit 200; and a control unit 50 having a computer program that controls operations of the units. The control unit 50 is included in a not-shown control device of the injection molding machine 1.

Hereinafter, outlines of a configuration and an operation of the mold clamping unit 100, and a configuration and an operation of the plasticizing unit 200 will be explained, and next, procedures of injection molding by the injection molding machine 1 will be explained.

[Configuration of Mold Clamping Unit]

The mold clamping unit 100 includes: a fixed die plate 105 that has been fixed on a base frame 101 and to which a fixed mold 103 has been attached; a movable die plate 111 that moves on a slide member 107, such as a rail and a slide plate in a left and right direction in FIG. 1 by actuating a hydraulic cylinder 113, and to which a movable mold 109 has been attached; and a plurality of tie bars 115 that couple the fixed die plate 105 with the movable die plate 111. At the fixed die plate 105, a hydraulic cylinder 117 for mold clamping is provided coaxially with each tie bar 115, and one end of the each tie bar 115 is connected to a ram 119 of the hydraulic cylinder 117.

Each of the components performs a necessary operation in accordance with an instruction of the control unit 50.

[Operation of Mold Clamping Unit]

An operation of the mold clamping unit 100 is outlined as follows.

First, the movable die plate 111 is moved to a position of a chain double-dashed line in FIG. 1 by actuation of the hydraulic cylinder 113 for mold opening and closing to thereby make the movable mold 109 abut against the fixed mold 103. Next, a male screw portion 121 of each tie bar 115 and a half nut 123 provided at the movable die plate 111 are engaged with each other to thereby fix the movable die plate 111 to the tie bars 115. Subsequently, a pressure of hydraulic oil of an oil chamber of a movable die plate 111 side in the hydraulic cylinder 117 is increased to thereby clamp the fixed mold 103 and the movable mold 109. After mold clamping is performed in a manner as described above, molten resin M is injected from the plasticizing unit 200 into a cavity of the mold to then form a molded product.

Since the screw 10 of the embodiment, as will be mentioned later, has a system that individually feeds a thermoplastic resin pellet P and reinforcing fibers F in a longitudinal direction of the screw, an entire length of the screw 10 or an entire length of the plasticizing unit 200 tends to be long. For this reason, in the embodiment, combining the mold clamping unit 100 having the above-mentioned configuration that can save a space is effective for suppressing an entire length of the injection molding machine 1 to be short, the mold clamping unit 100 being able to be installed even in a narrow space in which a mold clamping apparatus of a toggle link system or a system including a mold clamping cylinder at a back surface of a movable die plate cannot be installed. However, the configuration of the mold clamping unit 100 shown here is merely one example, and it does not prevent application of or replacement with the other configuration. For example, although the hydraulic cylinder 113 is shown as an actuator for mold opening and closing in the embodiment, it may be replaced with a combination of a mechanism that converts a rotational motion into a linear motion, and an electric motor, such as a servomotor and an induction motor. As the conversion mechanism, a ball screw and a rack and pinion can be used. In addition, it is needless to say that the mold clamping unit 100 may be replaced with a toggle link type mold clamping unit driven by electric drive or hydraulic drive.

[Configuration of Plasticizing Unit]

The plasticizing unit 200 includes: a cylindrical heating cylinder 201; a discharge nozzle 203 provided at a downstream end of the heating cylinder 201; the screw 10 provided inside the heating cylinder 201; a fiber feed device 213 to which the reinforcing fibers F are fed; and a resin feed hopper 207 to which the resin pellet P is fed. The fiber feed device 213 is coupled with a vent hole 206 provided closer to the downstream side than the resin feed hopper 207.

The plasticizing unit 200 includes: a first electric motor 209 that advances or retreats the screw 10; a second electric motor 211 that rotates the screw 10 in a normal or a reverse direction; and a pellet feed device 215 that feeds the resin pellet P to the resin feed hopper 207. Each of the components performs a necessary operation in accordance with an instruction of the control unit 50.

A load cell, whose illustration is omitted, intervenes between an end (a rear end) of the screw 10 on the downstream side thereof and the first electric motor 209, and can detect a load that the screw 10 receives in an axial direction. The plasticizing unit 200 driven by the electric motor controls a back pressure of the screw 10 in plasticization based on the load detected by the load cell. In the embodiment, the load detected by the load cell is used also for a purpose different from control of the back pressure. The point will be mentioned later.

The screw 10 has a two-stage type design similar to a so-called gas vent type screw. Specifically, the screw 10 has a first stage 21 provided on an upstream side, and a second stage 22 that continues to the first stage 21 and is provided on the downstream side, the first stage 21 includes a feed portion 23, a compression portion 24, and a measurement portion 70 in that order from the upstream side, and the second stage 22 includes a feed portion 25, a compression portion 26, and a measurement portion 71 in that order from the upstream side. Note that a right side in FIG. 1 is the upstream side, and that a left side therein is the downstream side.

In the screw 10, a first flight 27 is provided at the first stage 21, and a second flight 28 is provided at the second stage 22.

Figure 14A:
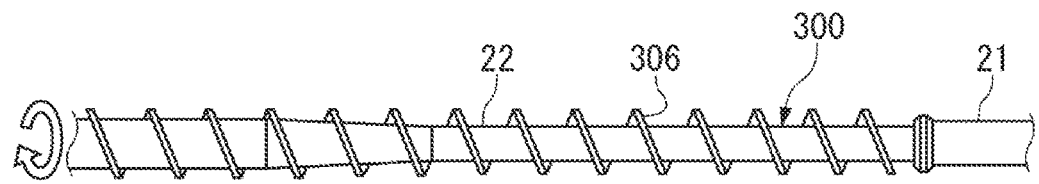
FIGS. 14A to 14C show a conventional plasticizing process.
Figure 14B:
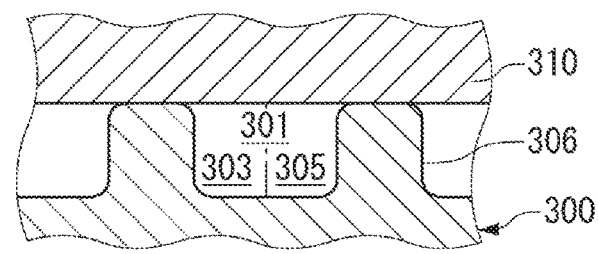

In both of the first stage 21 and the second stage 22, relatively, screw grooves between the flights in the feed portions 23 and 25 are set to be deep, screw grooves between the flights of the compression portions 24 and 26 are set to gradually decrease from the upstream side toward the downstream side, and screw grooves in the measurement portions 70 and 71 are set to be the most shallow. Here, since the screw groove of the feed portion 25 of the second stage 22 is deeper than that of the measurement portion 70 of the first stage 21, the molten resin M discharged from the first stage 21 to the feed portion 25 cannot fill the screw groove of the feed portion 25. Hereby, the molten resin M is pushed against the push side 305 by rotation of the screw 10, and is unevenly distributed. Hereby, a space is generated on the pull side 303 of the feed portion 25 of the second stage 22. For this reason, it is understood that the reinforcing fibers F fed from the fiber feed device 213 through the vent hole 206 are distributed to the pull side 303 serving as the space, and that thereby the molten resin M and the reinforcing fibers F are divided as shown in FIG. 14.

Since the first stage 21 conveys the generated molten resin M toward the second stage 22 in addition to melting a resin raw material to thereby generate the molten resin M, it may just include a function to secure a conveyance velocity and plasticizing capacity of the molten resin M.

In order to obtain the function, as shown in FIG. 1, it is preferable that a flight lead (L1) of the first flight 27 of the first stage 21 is not more than a flight lead (L2) of the second flight 28 of the second stage 22, i.e. L1≤L2 is established. Note that the flight lead (hereinafter simply referred to as a lead) means an interval between flights adjacent back and forth. As one index, the lead L1 of the first flight 27 is preferably set to be 0.4 to 1.0 times of the lead L2, and is more preferably set to be 0.5 to 0.9 times thereof.

According to the above-mentioned preferred mode in which L1≤L2 is established, the lead L2 of the second flight 28 of the second stage 22 is larger than the lead L1 of the first flight 27. The reinforcing fibers F are fed to a rear end side of the second stage 22 during the plasticizing process. When the lead L2 is large, a groove width between the second flights 28 is large so that the space in which the reinforcing fibers F drop and is filled becomes large. In addition to that, the number of times decreases that the vent hole 206 is blocked by the second flight 28 at the time of retreat of the screw 10 in the plasticizing process, and at the time of advance of the screw 10 in an injection process. Accordingly, even during the retreat or the advance of the screw 10, the drop of the reinforcing fibers F is not stopped at the second flight 28, and the reinforcing fibers F easily continuously drop in the groove. Specifically, in a region of the second flight 28 in which the reinforcing fibers F fed through the vent hole 206 are received, the lead L2 is preferably set to be not less than 1.0×D, and is more preferably set to be not less than 1.2×D. Thereby, the reinforcing fibers F can be stably dropped in the groove of the screw 10 during the injection process. Note that D is an inner diameter of the heating cylinder 201.

However, when the lead L2 becomes too large, a force of conveying the molten resin M becomes weak, conveyance of the molten resin M becomes unstable even at an extent of a back pressure (5 to 10 MPa) required for usual plasticization, the molten resin M due to the back pressure flows backward to the vent hole 206, and vent-up easily occurs. Accordingly, the lead L2 is preferably set to be not more than 2.0×D, and is more preferably set to be not more than 1.7×D. That is, the lead L2 of the second flight 28 is preferably set to be 1.0×D to 2.0×D, and is more preferably set to be 1.2×D to 1.7×D.

In addition, a width of the flight of the second flight 28 is preferably set to be 0.01 to 0.3 times (0.01×L2 to 0.3×L2) of the lead L2. This is because when the width of the flight is smaller than 0.01 times of the lead L2, strength of the second flight 28 becomes insufficient, and because when the width of the flight exceeds 0.3 times of the lead L2, a screw groove width becomes small, and the fibers are caught in a flight top to thereby be hard to drop in the groove.

In addition, besides the above-mentioned preferred mode in which L1≤L2 is established, a part or all of the second flights 28 particularly of the feed portion 25 of the second stage 22 may be a plural-thread flight (plural-thread flights) instead of a single-thread flight (single-thread flights). In this case, since the molten resin M discharged from the first stage 21 is divided and distributed into the screw grooves partitioned by the plural-thread flights, respectively, and thus a fiber bundle and the molten resin M are brought into contact with and are mixed with each other in each screw groove, respectively, the plural-threaded flights are effective for impregnation of the molten resin M into the fiber bundle. Further, since the number of times of passes of the flights under the vent hole 206 per one rotation of the screw 10 is increased by the plural-threaded flights by employing the plural-threaded flights for the region to which the reinforcing fibers F are fed from the fiber feed device 213, capability to scrape the reinforcing fibers F from the vent hole 206 is improved, and efficiency of taking the reinforcing fibers F in the screw 10 groove is improved.

In the fiber feed device 213 of the embodiment, a biaxial type screw feeder 214 is provided at the heating cylinder 201 as shown in FIG. 1, and the reinforcing fibers F are forcibly fed in the groove of the screw 10. Note that it is needless to say that there is no problem if a uniaxial type screw feeder is used.

As a method of feeding the reinforcing fibers F to the biaxial type screw feeder 214, roving fibers may be directly put in the biaxial type screw feeder 214, or chopped fibers may be put therein. Alternatively, the roving fibers and the chopped fibers may be mixed and put in the biaxial type screw feeder 214 at a predetermined ratio.

In a case where the chopped fibers are put in the biaxial type screw feeder 214, the roving fibers may be conveyed near a fiber inlet of a measurement feeder as they are, and may be put in the above-described measurement feeder immediately after being cut near the fiber inlet. Hereby, since the chopped fibers likely to be scattered are not exposed before being put in the molding machine, workability can be improved.

In the embodiment, a roving cutter 218 is provided near the fiber inlet of the biaxial type screw feeder 214. The roving fibers are cut by the roving cutter 218 to thereby be made into the chopped fibers, and then, they are fed to the biaxial type screw feeder 214.

[Operation of Plasticizing Unit]

An operation of the plasticizing unit 200 is outlined as follows. Please refer to FIG. 1.

When the screw 10 provided inside the heating cylinder 201 is rotated, the reinforcing fibers F fed from the fiber feed device 213 through the vent hole 206, and a pellet (the resin pellet P) comprising thermoplastic resin fed from the resin feed hopper 207 is sent out toward the discharge nozzle 203 of the downstream end of the heating cylinder 201. Note that timing to start the feed of the reinforcing fibers F is preferably set to be a timing after the resin pellet P (the molten resin M) fed from the resin feed hopper 207 reaches the vent hole 206 through which the reinforcing fibers F are fed. When the reinforcing fibers F are started to be put in before the molten resin M reaches the vent hole 206, the reinforcing fibers F poor in flowability, and conveyability by the screw 10 block the inside of the screw groove, thereby the molten resin M might be prevented from being conveyed to overflow the vent hole 206, or abnormal wear and breakage of the screw 10 might occur. After the molten resin M is mixed with the reinforcing fibers F, only a predetermined amount of the molten resin M is injected to the cavity formed between the fixed mold 103 and the movable mold 109 of the mold clamping unit 100. Note that it is needless to say that a basic operation of the screw 10 in which injection is performed by advance of the screw 10 follows after the screw 10 retreats while receiving the back pressure along with melting of the resin pellet P. In addition, the present invention does not prevent applying or being replaced with the other configuration, such as providing a heater outside the heating cylinder 201 in order to melt the resin pellet P.

[Procedure of Injection Molding]

The injection molding machine 1 including the above components performs injection molding in the following procedures.

Injection molding, as is known well, includes: a mold clamping process of closing the movable mold 109 and the fixed mold 103, and clamping them with a high pressure; a plasticizing process of heating, melting, and plasticizing the resin pellet P in the heating cylinder 201; an injection process of injecting the plasticized molten resin M to the cavity formed by the movable mold 109 and the fixed mold 103, and filling the cavity with the plasticized molten resin M; a holding process of cooling the molten resin M with which the cavity has been filled until it is solidified; a mold opening process of opening the mold; and a taking-out process of taking out a molded product cooled and solidified in the cavity. The above-mentioned respective processes are sequentially carried out, or a part of them is concurrently carried out, and the one-cycle injection molding is completed.

Subsequently, outlines of the plasticizing process and the injection process to which the embodiment is related will be explained in that order with reference to FIGS. 2A to 2C. In the embodiment, although the screw 10 is forcibly retreated during the plasticizing process, an operation of the retreat is explained with reference to FIGS. 3A to 3F after explanation of the injection process.

[Plasticizing Process]

In the plasticizing process, the resin pellet P is fed through a feed hole 208 corresponding to the resin feed hopper 207 of the upstream side of the heating cylinder 201. The screw 10 at the time of plasticization start is located on the downstream of the heating cylinder 201, and it is retreated from an initial position while being rotated ("plasticization start" in FIG. 2A). By rotating the screw 10, the resin pellet P fed between the screw 10 and the heating cylinder 201 is gradually melted while being heated by receiving a shear force, and is conveyed toward the downstream. Note that rotation (a direction) of the screw 10 in the plasticizing process is set to be a normal rotation in the present invention. If the molten resin M is conveyed to the fiber feed device 213, the reinforcing fibers F are fed from the fiber feed device 213. Along with the rotation of the screw 10, the reinforcing fibers F are kneaded with and dispersed in the molten resin M, and are conveyed to the downstream together with the molten resin M. When feed of the resin pellet P and the reinforcing fibers F is continued, and the screw 10 is continued to be rotated, the molten resin M is conveyed to the downstream side of the heating cylinder 201 together with the reinforcing fibers F, and is accumulated closer to the downstream side than the screw 10. The screw 10 is retreated by balance between a resin pressure of the molten resin M accumulated on the downstream of the screw 10 and the back pressure that suppresses the retreat of the screw 10. After that, the rotation and the retreat of the screw 10 are stopped at the time when an amount of the molten resin M required for one shot is measured and accumulated ("plasticization completion" in FIG. 2B).

Figure 2A:
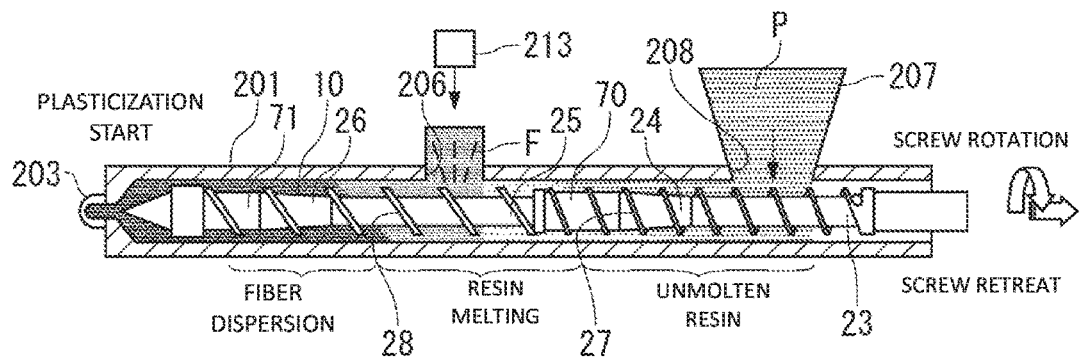
FIGS. 2A to 2C are views schematically showing molten states of resin in respective procedures of injection molding according to the embodiment.
Figure 2B:
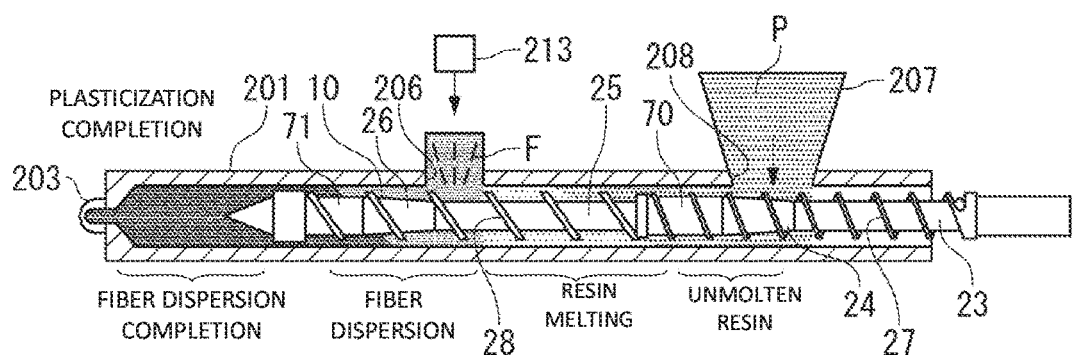
Figure 2C:
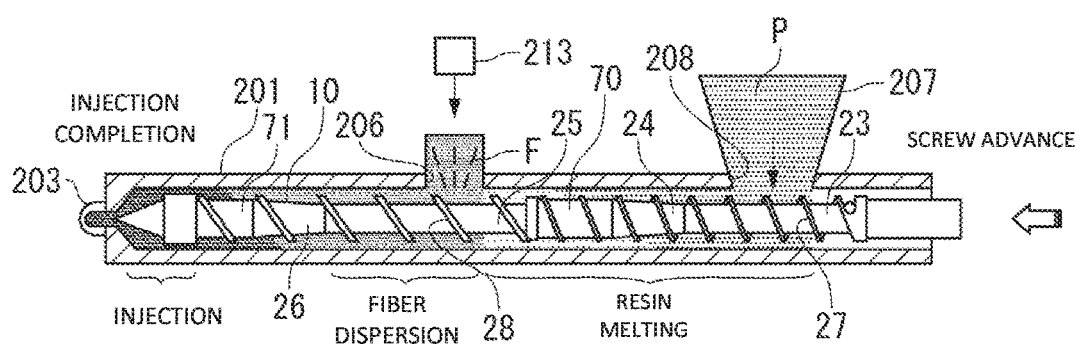

FIGS. 2A, 2B, and 2C show states of the resin (the resin pellet P or the molten resin M) and the reinforcing fibers F by dividing the states into four stages of "unmolten resin", "resin melting", "fiber dispersion", and "fiber dispersion completion". In the stage of "plasticization completion", the "fiber dispersion completion" closer to the downstream than the screw 10 shows the state where the reinforcing fibers F are dispersed in the molten resin M, and are subjected to injection, and the "fiber dispersion" shows that the fed reinforcing fibers F are dispersed in the molten resin M along with the rotation of the screw 10. In addition, the "resin melting" shows that the resin pellet P is gradually melted by receiving the shear force, and the "unmolten resin" shows the state where the insufficiently melted resin remains although the shear force is received, and shows that not all the resin has been melted. However, the reinforcing fibers F may be unevenly distributed in a region of the "fiber dispersion completion" in some cases.

[Injection Process]

When the procedures enter the injection process, the screw 10 is advanced as shown in FIG. 2C. In that case, a not-shown backflow prevention valve included in a tip of the screw 10 is closed, thereby the pressure (the resin pressure) of the molten resin M accumulated on the downstream of the screw 10 rises, and the molten resin M is discharged toward the cavity from the discharge nozzle 203.

Hereafter, one-cycle injection molding is completed through the holding process, the mold opening process, and the taking-out process, and the mold clamping process and the plasticizing process of a next cycle are performed.

[Forcible Retreat of Screw 10]

In the embodiment, the screw 10 is forcibly retreated during the plasticizing process.

Usually, in the plasticizing process, the screw 10 retreats while receiving the back pressure by the resin pressure of the molten resin M conveyed to the downstream along with the rotation of the screw 10. Forcible retreat or forced retreat in the embodiment means that the screw 10 is retreated by an operation of the first electric motor 209 instead of the resin pressure. The forced retreat has a faster retreat velocity compared with the retreat by the resin pressure, and the retreat velocity is, for example, set to be not less than twice of a velocity of the retreat by the resin pressure. Hereinafter, forcible retreat of the screw 10 will be explained in detail with reference to FIGS. 3A to 3F. Note that only the components necessary for explanation of the forcible retreat are depicted in FIGS. 3A to 3F.

[Basic Forcible Retreat]

If the plasticizing process is started, and the downstream side of the screw 10 is filled with the molten resin M, the screw 10 is forcibly retreated (first retreat, FB1) by a distance (a stroke) D1. Although this process is shown in FIGS. 3A and 3B, a space S1 where the molten resin M is not present is formed closer to the downstream side than the tip of the screw 10 as a result of the first retreat. A position of the screw 10 at this time is called a first retreated position.

Note that here, the screw 10 shall be continuously retreated by the stroke D1 without stopping halfway, and that additionally, rotation of the screw 10 shall be stopped while being forcibly retreated. However, the screw 10 can also be rotated in the normal direction in the middle of performing forcible retreat. In addition, the forcible retreat of the screw 10 is not limited to the retreat by the stroke D1, and it may be performed until a counter, such as a timer started from predetermined timing counts up, or may be performed by combining the stroke D1 with the counting-up of the counter.

In addition, the space S1 is formed in an expanded manner since it comes to have a lower pressure than the inside of the molten resin M in addition to a fact that the space S1 is created by leakage of gas components mainly containing a volatile component, the gas components having been contained in the molten resin M. The pressure of the molten resin M is raised by the screw 10 when next first normal rotation is performed, and the gas components that occupy the space S1 are again pushed into the molten resin M.

Next, the molten resin M is conveyed toward the downstream by rotating (the first normal rotation, NR1) the screw 10 in the first retreated position, and the space S1 formed in advance is replenished with the molten resin M as shown in FIG. 3C.

If the space S1 is filled with the molten resin M, the screw 10 is forcibly retreated (second retreat, FB2) by the distance (the stroke) D1 similarly to the first retreat. Although this process is shown in FIGS. 3C and 3D, a space S2 where the molten resin M is not present is formed closer to the downstream side than the tip of the screw 10 as a result of the forcible retreat. Although a position of the screw 10 at this time is called a second retreated position, the second retreated position coincides with a position (a measurement position) of the screw 10 at which the amount of the molten resin M necessary for one shot is measured. That is, in the embodiment, forcible retreat is performed twice at an equal stroke, and thereby the screw 10 is retreated to the measurement position. In addition, in the first retreat and the second retreat, strokes of the forcible retreat of the screw 10 may be the same as each other or may be different from each other. Further, in the first retreat and the second retreat, velocities of the forcible retreat of the screw 10 may be the same as each other or may be different from each other.

In addition, in the first retreat, even though it is detected by an after-mentioned detection technique that the space S1 has been filled with the molten resin M by the rotation of the screw 10 at the first retreated position, the rotation of the screw 10 is continued without being stopped. After the screw 10 is retreated at a predetermined stroke, for a predetermined time, or by an arbitrary combination of the predetermined stroke and the predetermined time based on the pressure of the molten resin M or at a predetermined velocity, the screw 10 may be forcibly retreated to the second retreated position.

Hereby, a bubble treatment effect, which will be mentioned later, can be obtained, and the retreated position of the screw 10 is controlled and plasticized by a predetermined back pressure without fixing the position of the screw 10, whereby it can be prevented that the back pressure excessively rises and that thereby an excessive shear force is applied to the molten resin M and the reinforcing fibers F in the screw groove. In addition, in the present invention, the screw 10 can be retreated while being further rotated in a state where the screw 10 is rotated and where the spaces S1 and S2 are replenished with the molten resin M, promoting opening of the reinforcing fibers F by the retreat operations of the screw 10 for forming the spaces S1 and S2. Hereby, compared with the molten resin in the screw groove in a case of being plasticized only under conditions where the back pressure is hardly applied, the conditions being in a state where the space is formed, or under course low back pressure conditions where the back pressure cannot be controlled to be a desired back pressure value, a further shear force by the rotation of the screw 10 is applied to the molten resin M in a screw groove 31 of the present invention in a state where the spaces S1 and S2 are replenished with the molten resin M, and decrease in resin viscosity is promoted along with rise in temperature of the molten resin M. Hereby, the molten resin M easily gets into the fiber bundle of the reinforcing fibers F, and opening of the reinforcing fibers F can be more promoted. In addition, since a back pressure value can be increased to a desired value as needed, control of a kneading degree of the molten resin in the screw groove can be easily performed.

In addition, in a case where a range of sufficient retreat velocities necessary for the opening of the reinforcing fibers F is grasped in advance by an experiment or numerical analysis, etc., the retreat operation of the screw 10 may be performed in an accelerated manner until the retreat velocity of the screw 10 reaches one not less than the sufficient retreat velocity necessary for the opening of the reinforcing fibers F by a predetermined acceleration condition (an acceleration distance or acceleration). Alternatively, in a case where a forcible retreat force necessary for achieving the sufficient retreat velocity necessary for the opening of the reinforcing fibers F is grasped in advance, the retreat operation of the screw 10 may be performed until a retreat force of the screw 10 reaches one not less than the forcible retreat force.

It can be detected by the above-mentioned load cell whether or not the space S1 has been filled with the molten resin M. That is, when the space S1 is filled from a state where it is present, the screw 10 receives a load from the molten resin M, and thus it can be detected that the space S1 has been filled with the molten resin M by detecting the load through the screw 10. Additionally, the second retreat is executed in the wake of the detection.

Detection of the space S1 having been filled with the molten resin M cannot be performed only by the load cell, but the other means can be applied. When the space S1 is filled with the molten resin M, the screw 10 may slightly retreat in some cases, and thus filling of the space S1 can be detected by detecting the displacement. In addition, filling of the space S1 can be detected also by providing a pressure gauge that penetrates the heating cylinder 201 and is communicated with an inside of the heating cylinder.

Next, the molten resin M is conveyed toward the downstream by rotating (second normal rotation, NR2) the screw 10 in the second retreated position, and the space S2 formed in advance is replenished with the molten resin M as shown in FIG. 3E.

In addition, even though it is detected that the space S2 has been filled with the molten resin M by the rotation of the screw 10 after forcible retreat is ended with the second retreated position being set as a position before the screw 10 reaches the measurement position, the rotation of the screw 10 may be continued without being stopped, and the screw 10 may be retreated to the measurement position based on the pressure of the molten resin M or at the predetermined velocity.

Hereby, there can be obtained an effect similar to the case where it is detected by the after-mentioned detection technique that the space S1 has been filled with the molten resin M by the rotation of the screw 10 at the above-mentioned first retreated position, and the case where the rotation of the screw 10 is continued without being stopped, and where the screw 10 is retreated based on the pressure of the molten resin M or at the predetermined velocity. In addition, since usually, the molten resin discharged from the screw located near a measurement completion position in the end of the plasticizing process is plasticized in a state where an effective screw length is short, a distance and a time of receiving the shear force are short. For this reason, since opening of the fiber bundle is likely to be insufficient, the molten resin M may be plasticized while the back pressure is applied to the screw 10 near the measurement completion position in the end of the plasticizing process. Hereby, insufficient mixing or kneading of the molten resin M plasticized in the end of the plasticizing process can be prevented.

If the space S2 is filled with the molten resin M, the screw 10 is advanced to perform the injection process as shown in FIG. 3F. During this period, the screw 10 is rotated neither in the normal direction nor in the reverse direction.

Although the forcible retreat of the screw is shown as the first retreat and the second retreat in the embodiment, the number of times of the forcible retreat may be increased as needed, for example, third retreat, fourth retreat, and so on. At this time, aspects of the first retreat and the second retreat shown in the embodiment can be similarly applied to the increased forcible retreat, such as the third retreat, the fourth retreat, and so on.

Although the plasticizing process accompanied by the forcible retreat of the screw 10 is performed in the above procedures, next, an action and an effect by the forcible retreat will be explained with reference to FIGS. 4A to 4D and FIGS. 5A to 5D.

Figure 4A:
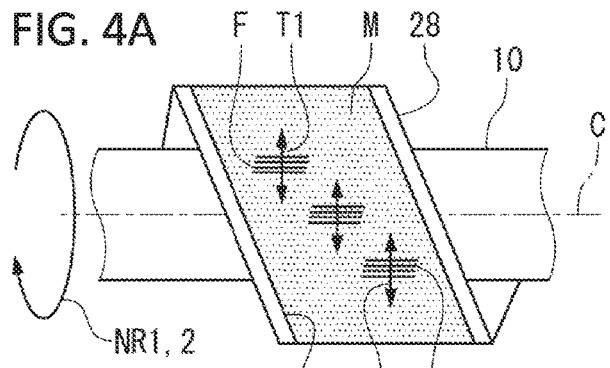
FIGS. 4A to 4D In the embodiment.
Figure 4B:
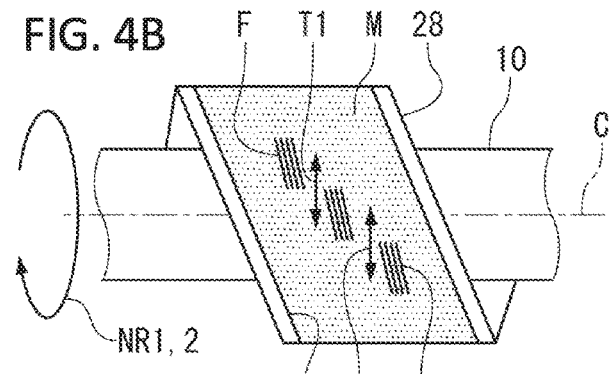
Figure 4C:
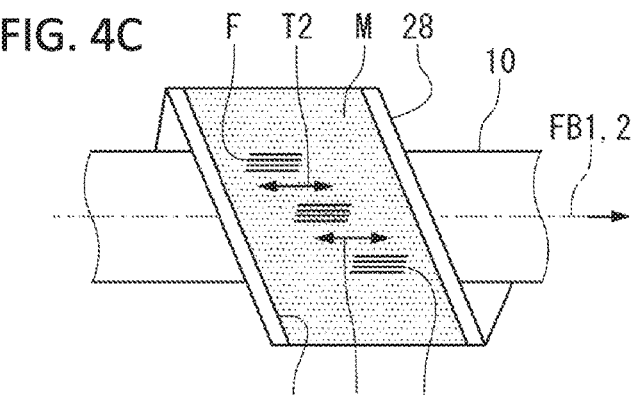
Figure 4D:
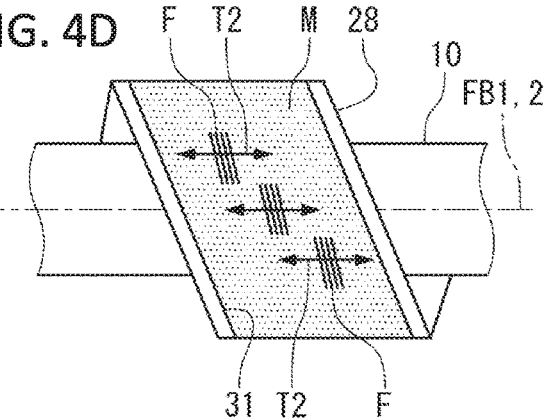

The molten resin M in the screw groove 31, as shown in FIGS. 4A and 4B, receives a shear force T1 in a peripheral direction of the screw 10 while the screw 10 performs the normal rotation NR1 and NR2. Among the reinforcing fibers F contained in the molten resin M, there are a fiber bundle in which longitudinal directions of the reinforcing fibers F are aligned along a direction of a rotation axis C (hereinafter referred to as an axial direction C) of the screw 10 as shown in FIG. 4A, and a fiber bundle in which the longitudinal directions of the reinforcing fibers F are aligned along the peripheral direction perpendicular to the axial direction C as shown in FIG. 4B. In addition, there is also a fiber bundle in which the longitudinal directions of the reinforcing fibers F are aligned in a not-shown direction having arbitrary angles also to both of the direction of the rotation axis C and the peripheral direction perpendicular to the axial direction C. Although the shear force T1 in the peripheral direction works as a force to open the bundle of the reinforcing fibers F in which the longitudinal directions of the reinforcing fibers F are aligned along the axial direction, it does not work as a force to open the bundle of the reinforcing fibers F aligned along the peripheral direction. Meanwhile, the molten resin M in the screw groove 31, as shown in FIGS. 4C and 4D, receives a shear force T2 along the axial direction C of the screw 10 while the screw 10 performs the forcible retreat FB1 and FB2. Although the shear force T2 does not work as the force to open the bundle of the reinforcing fibers F in which the longitudinal directions of the reinforcing fibers F are aligned along the axial direction as in FIG. 4C, it works as a force to open the bundle of the reinforcing fibers F aligned along the peripheral direction as in FIG. 4D.

By the way, although the screw 10 is retreated by the pressure of the molten resin M also in the usual plasticizing process, the retreat velocity is largely affected by a type of the resin raw material, a molding temperature, etc. For this reason, it is difficult to control the retreat velocity of the screw 10 to be the desired retreat velocity, i.e. the sufficient retreat velocity necessary for opening the reinforcing fibers F, and thus opening of the reinforcing fibers F can be promoted effectively and practically by the present invention that positively performs forcible retreat.

As described above, the forcible retreat is performed in addition to the normal rotation, and thereby the forces to open the reinforcing fibers F can be given to both of the reinforcing fibers F along the axial direction and the reinforcing fibers F along the peripheral direction.

Figure 5A:
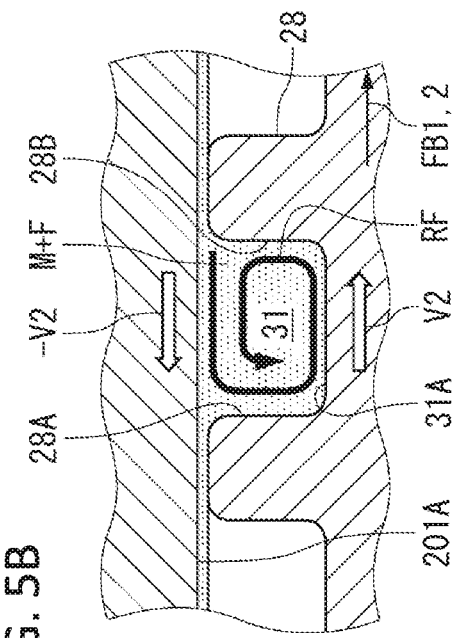
FIGS. 5A to 5D In the embodiment.

Here, as shown in FIG. 5A, when the screw 10 performs the normal rotation (NR1 and NR2), a velocity V1 is generated in the molten resin M having adhered to a bottom surface 31A of the screw groove 31, and hereby, a velocity −V1 is relatively generated in the molten resin M having adhered to an inner wall surface 201A of the heating cylinder 201. By a difference between the relative velocities, the shear force T1 along the peripheral direction of the screw 10 is generated in the molten resin M as shown in FIG. 5C. At this time, the pressure is raised from a pull side (a left side in FIGS. 5B and 5C) toward a push side (a right side of FIGS. 5B and 5C) of the second flight 28 by a screw pump action generated when the screw 10 performs the normal rotation (NR1 and NR2). Consequently, the push side of the reinforcing fibers F is relatively tight, and the pull side thereof is relatively rough.

Figure 5B:
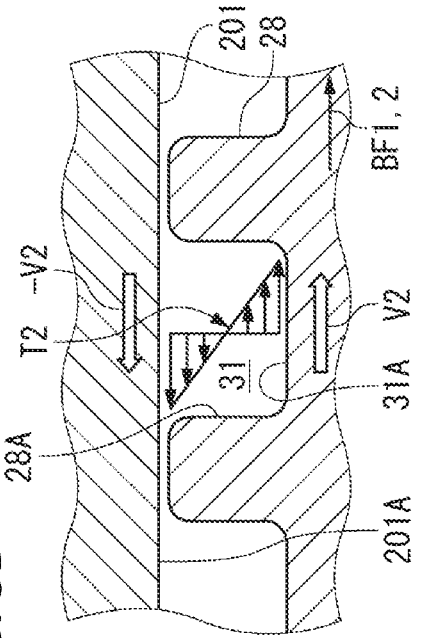
Figure 5C:
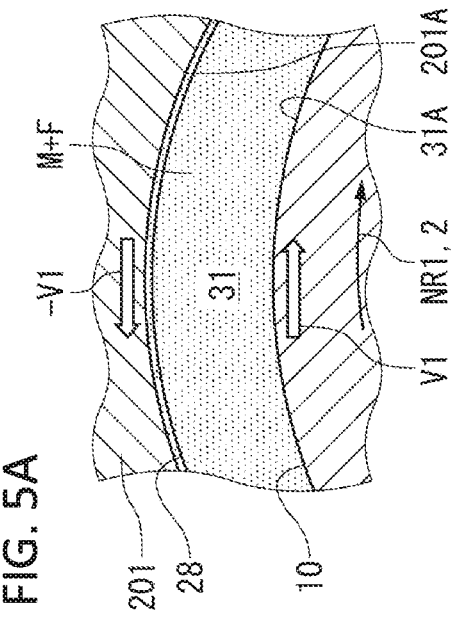
Figure 5D:
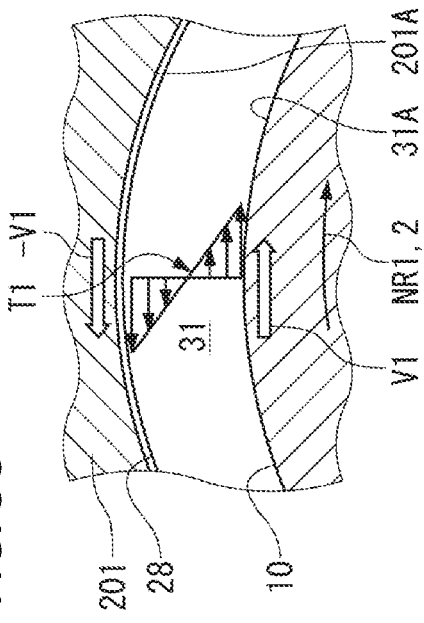
Figure 7A:
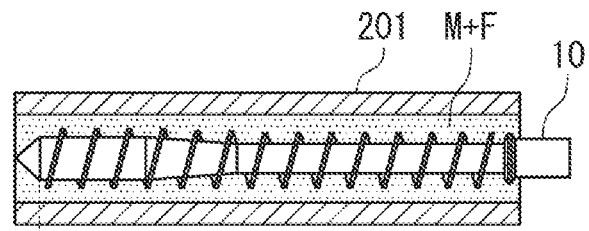
FIGS. 7A to 7E are views showing an example in which the screw is intermittently forcibly retreated by a predetermined stroke.
Figure 7B:
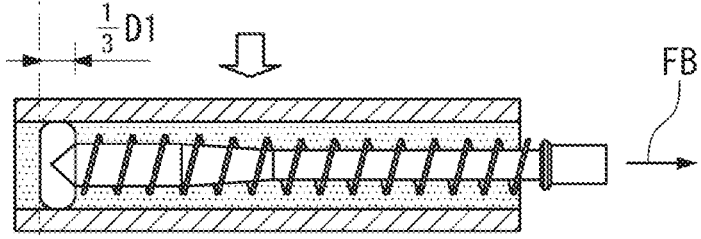
Figure 7C:
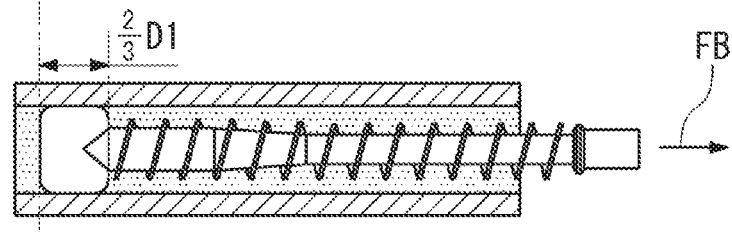
Figure 7D:
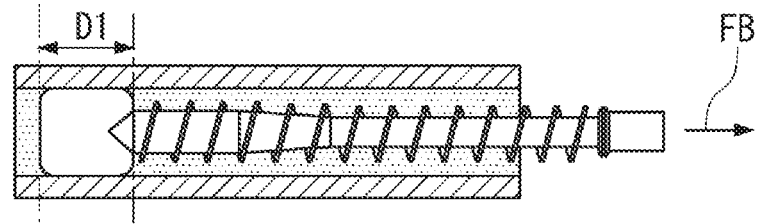
Figure 7E:
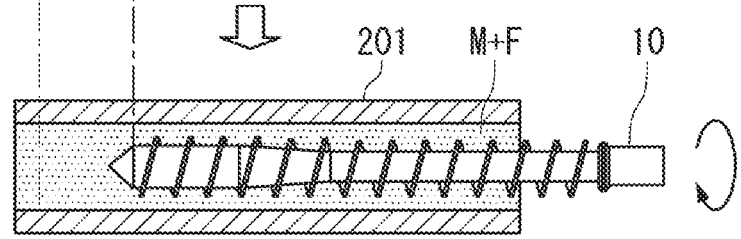

Meanwhile, when the screw 10 is forcibly retreated (FB1 and FB2) as shown in FIG. 5B, a velocity V2 is generated in the molten resin M having adhered to the bottom surface 31A of the screw groove 31, and hereby, a velocity −V2 is relatively generated in the molten resin M having adhered to the inner wall surface 201A of the heating cylinder 201. Hereby, since the reinforcing fibers F that have become tight on the push side of the second flight 28 are dragged and moved to the pull side of the second flight 28 when the screw 10 performs the normal rotation (NR1 and NR2), an effect can be obtained that the reinforcing fibers F of the push side of the flight become rough from tight, i.e. a lump fiber bundle of the reinforcing fibers F is loosened. Along with this, the shear force T2 along the axial direction C of the screw 10, i.e. a groove width direction of the screw groove 31 is generated in the molten resin M as shown in FIG. 5D by a relative velocity difference between the velocity V2 and the velocity −V2. At this time, the molten resin M having adhered to the inner wall surface 201A of the heating cylinder 201 is scraped at a top portion of the pull side (the left side in FIG. 5D) of the flight 28, and flows into the screw groove 31 along a side surface 28A of the pull side of the flight 28. Further, the scraped molten resin M flows in the screw groove 31 along the bottom surface 31A of the screw groove 31, a side surface 28B of the push side of the flight 28, and the inner wall surface 201A, and a swirling flow RF of the molten resin M along the axial direction C is formed in the screw groove 31. Hereby, velocity flows different in magnitude and direction are generated in a groove depth direction in the screw groove 31 as shown in FIG. 5D (similarly, although velocity flows different in magnitude and direction are generated also in the groove width direction by the swirling flow RF, they are not explained here for simplification of explanation). Although a shear force is generated by the difference in velocity in the groove depth direction, the shear force can be applied to the reinforcing fibers F over an entire region in a groove direction of the screw groove 31 since the velocity difference is distributed in an entire region in the groove width direction, and particularly, it works as a force to open the bundle of the reinforcing fibers F in which the longitudinal directions of the reinforcing fibers F are aligned along the peripheral direction perpendicular to the axial direction C, or the bundle of the reinforcing fibers F in which the longitudinal directions of the reinforcing fibers F have a small angle with the peripheral direction.

Figure 14C:
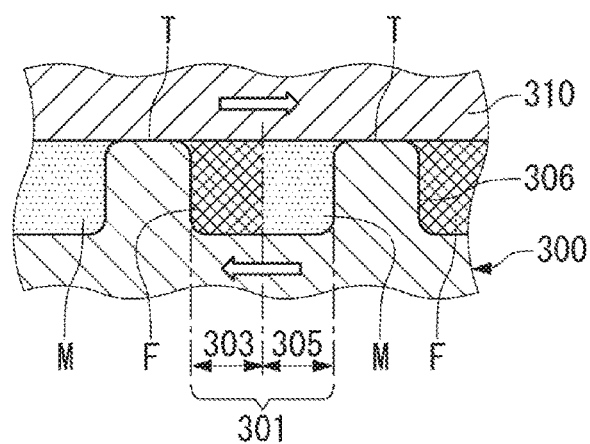

In addition, in a case where the fiber bundle, which is a set of a number of reinforcing fibers F near the feed portion of the reinforcing fibers F etc., and the molten resin M are separately present on the pull side 303 and the push side 305 of the flight, respectively as shown in FIG. 14C, the molten resin M by the swirling flow RF flows between the pull side 303 of the flight and the fiber bundle of the reinforcing fibers F and enters the inside of the bundle of the reinforcing fibers F, and thus opening of the fiber bundle can be promoted.

In addition, since in the embodiment, the screw 10 performs the first retreat, the first normal rotation, the second retreat, and the second normal rotation in that order, the reinforcing fibers F alternately receive the shear force T2 in the groove width direction and the shear force T1 in the peripheral direction. Hereby, since the reinforcing fibers F are changed in phase to be subjected to the shear forces in different directions in each case while the fiber bundle is loosened not by the shear force in one direction but by the shear forces in the respective directions, opening of the fibers can be more promoted by a synergetic effect with a stirring force than a case where the forcible retreat and the rotation of the screw are merely independently performed, respectively.

As explained above, according to the embodiment in which forcible retreat of the screw 10 is performed during the plasticizing process, normal rotation of the screw 10 performed in the plasticizing process, and the forcible retreat of the screw 10 are performed. Hereby, since the shear force T1 and the shear force T2 in the directions perpendicular to each other are combined and applied to the molten resin M inside the screw groove 31, the fiber bundle of the reinforcing fibers F in which the longitudinal directions of the reinforcing fibers F are aligned at random in an arbitrary direction can be opened. Accordingly, according to the embodiment, uneven distribution due to poor opening of the reinforcing fibers F is eliminated, and high fiber reinforced resin having high dispersibility of the reinforcing fibers F can be obtained.

In addition, the swirling flow RF of the molten resin M generated along the axial direction C of the screw 10 in the screw groove 31 by forcible retreat is generated over the entire length of the screw 10. Consequently, usually, dispersibility is improved not only in the reinforcing fibers F that has reached the tip of the screw 10 that has been subjected to the shear for a long time, but in the reinforcing fibers F present in the screw groove 31 from the tip of the screw 10 to the vent hole 206 through which the reinforcing fibers F are fed. Hereby, the reinforcing fibers F in the screw groove 31 are sufficiently dispersed, which causes a state where the inside of the screw groove 31 is flocculently filled with the reinforcing fibers F. For this reason, in a case where a high back pressure is applied at the time of plasticization, in a case where a pressure in the screw groove 31 is lowered, and the molten resin M in the screw groove 31 is expanded by the stop of the rotation of the screw 10 at the time of machine stop etc. when molding operation is interrupted or ended, etc., even though the molten resin M tends to flow backward to the vent hole 206, flow resistance when the molten resin M flows backward through flocculent fibers in small gaps of the reinforcing fibers F becomes large, and a backflow amount is decreased. Accordingly, vent-up can be suppressed, and trouble of poor feed of the reinforcing fibers F and failure trouble of the biaxial type screw feeder 214 due to the molten resin M infiltrating and being solidified in the biaxial type screw feeder 214 by the vent-up can be prevented.

[Pattern Example of Forcible Retreat]

A pattern of forcible retreat explained above is one example of the present invention, and the plasticizing process including the forcible retreat can be performed by the other pattern.

For example, as shown in FIGS. 6A to 6D, the screw 10 can be displaced to the measurement position by performing forcible retreat FB once.

[Intermittent Forcible Retreat]

In addition, as shown in FIGS. 7A to 7D, when forcible retreat is performed by the predetermined stroke D1, the stroke D1 can be divided to thereby intermittently retreat the screw 10, for example, the screw 10 is retreated and stopped (FIG. 7B) by ⅓×D1, is retreated and stopped (FIG. 7C), and so on. The intermittent forcible retreat can be applied to each forcible retreat of a pattern in which the screw 10 is displaced to the measurement position by performing a plural times of forcible retreat shown in FIGS. 3A to 3D, and can be applied also to a pattern in which the screw 10 is displaced to the measurement position by performing one-time forcible retreat shown in FIGS. 6A to 6D. In addition, each of distances obtained by dividing the stroke D1 in the intermittent forcible retreat may be a uniform one, or a part or all of them may be different. In addition, each of retreat velocities in the intermittent forcible retreat may be a uniform one, or a part or all of them may be different (multi-stage velocity).

Figure 8:
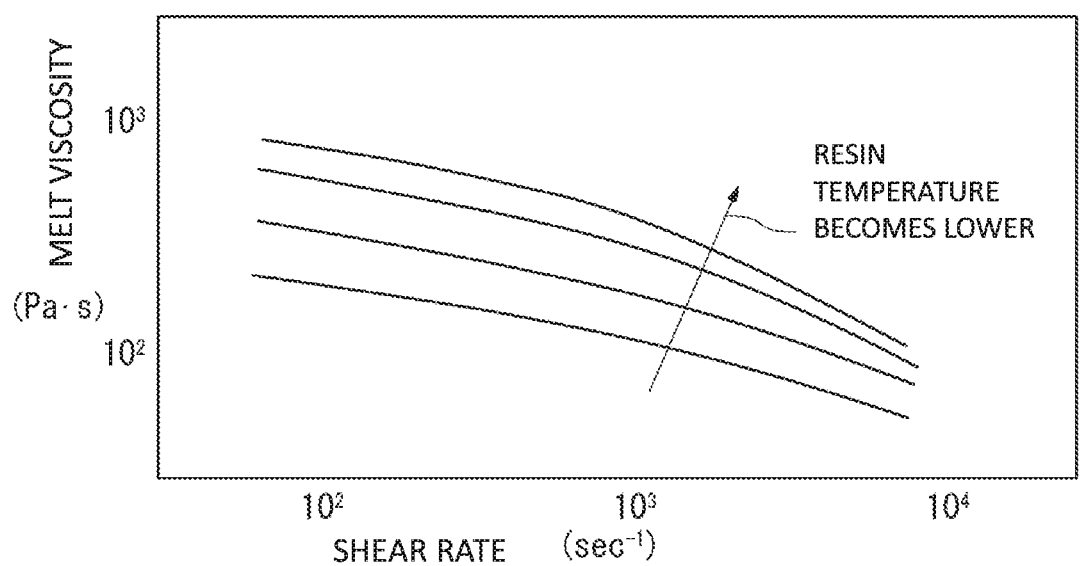
FIG. 8 is a graph showing a relation between a shear rate and a melt viscosity of the molten resin.

It can be expected to more promote the opening of the reinforcing fibers F by the intermittent forcible retreat. That is, although a relation between a shear rate and a melt viscosity of molten resin is shown in FIG. 8, the lower the shear rate is, the higher the viscosity is. When a case is assumed where a flow is made to occur in the molten resin M inside the screw groove 31, the molten resin behaves substantially as a solid at the moment when a force is applied to the molten resin M in order to make the molten resin M flow from a state where the molten resin M has no flow and is stopped. That is, in the behavior at this moment, the shear force applied to a surface of the molten resin can be transmitted to the reinforcing fibers F inside the molten resin to thereby loosen the fiber bundle of the reinforcing fibers F without being consumed by deformation of the molten resin. The shear force is further continuously applied to the molten resin, thereby a high shear force is applied to the fiber bundle due to a high viscosity state in a low shear rate region in the middle of acceleration, a flow can be generated in the molten resin to thereby add a stirring effect to the loosened fiber bundle, and thus opening of the fiber bundle can be promoted.

In addition, although the shear force generated in the molten resin is a product of a melt viscosity value and a shear rate value, as shown in FIG. 8, the viscosity is low when the shear rate is large, and the shear rate is small when the viscosity is high. Consequently, conditions where the viscosity and the shear rate have well-balanced large values are needed in order to obtain a large shear force. However, since the melt viscosity is largely affected not only by the shear rate but a type of raw resin and a resin temperature, grasping the conditions where the viscosity and the rate have the well-balanced large values needs knowledge of resin property, is complicated, and is not easy. However, since the velocity of the screw 10 is continuously changed from low to high in the middle of acceleration of forcible retreat by performing the intermittent forcible retreat, a shear force field by a combination of the viscosity and the shear rate is continuously widely applied to the molten resin, and conditions where the high shear force is obtained can be achieved. Hereby, even though there is no knowledge of resin property, forcible retreat conditions can be carried out where the large shear force effective for the opening of the reinforcing fibers F can be applied.

Accordingly, since the effective shear force and stirring force can be repeatedly applied to the fiber bundle in the screw groove 31 by increasing the number of times of the movement start, an opening degree of the fiber bundle can be increased.

In addition, the velocity of the screw 10 in performing the intermittent forcible retreat is not limited to be constant, and it can be changed. For example, in a case of the above-mentioned example, when the screw 10 is retreated by the stroke D1, a velocity of a first half can be increased, a velocity of a latter half can be decreased, or the reverse can also be performed. Since the molten resin behaves similarly to the solid at a moment when the velocity is switched from high to low or from low to high similarly to the case where the shear force is applied in the above-mentioned state where the screw 10 is stopped, an effective shear and stirring force can be added to the fiber bundle in the screw groove 31 by changing the velocity during the forcible retreat.

In addition, in a case where the screw 10 is intermittently forcibly retreated, an individual retreat velocity can be changed, for example, a high velocity, a low velocity, a high velocity, a low velocity, and so on.

In addition, in the case where the screw 10 is intermittently forcibly retreated, retreat control can also be performed continuously or intermittently until the retreat velocity or the forcible retreat force of the screw 10 reaches one not less than the above-mentioned sufficient retreat velocity or forcible retreat force necessary for the opening of the reinforcing fibers F.

In addition, although rotation of the screw 10 is stopped at the time of the forcible retreat in the above, the screw 10 may be forcibly retreated while being rotated in the normal direction. In this case, the screw 10 can be rotated in the normal direction over a whole period of the forcible retreat, or can be rotated in the normal direction only for a partial period of the forcible retreat. In addition, although normal rotation of the screw 10 for filling the space S1 or the space S2 after the forcible retreat is performed at the first retreated position or the second retreated position, the normal rotation of the screw 10 for filling the space S1 or S2 can be performed while the screw 10 is advanced. In this case, since the space S1 or the space S2 can be reduced by the molten resin by the normal rotation of the screw 10, and simultaneously, the space S1 or the space S2 can be reduced by advancing the screw 10, the space S1 or the space S2 can be filled in a short time, and productivity is improved. An advance velocity of the screw 10 at this time may be an advance velocity substantially the same as the retreat velocity of the screw 10 by the pressure of the resin, i.e. a low velocity less than a sufficient moving velocity necessary for the opening of the fiber bundle.

[Bubble Treatment]

Although in the above embodiment, the first normal rotation is shifted to the second retreat when it is detected that the space S1 formed in advance has been filled with the molten resin M, it is preferable to perform bubble treatment that applies a predetermined pressure to the molten resin M occupying the region in excess of the filling of the space S1. The reason will be explained with reference to FIGS. 9A to 9D.

Figure 9A:
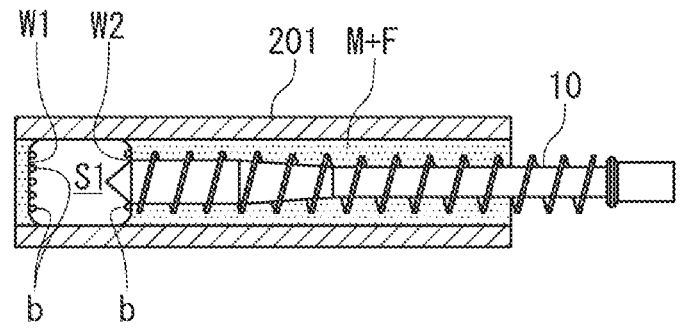
FIGS. 9A to 9D are views showing procedures of bubble treatment performed when a space S1 is filled with molten resin M.
Figure 9B:
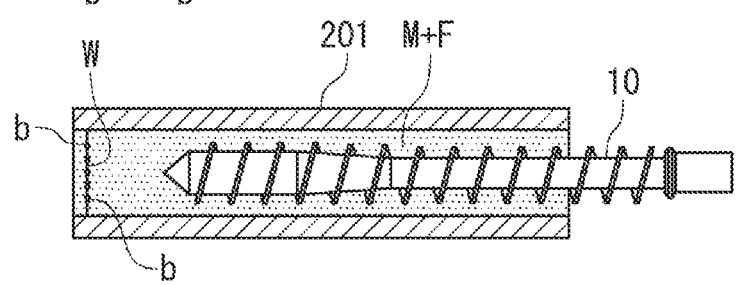

As shown in FIG. 9A, gas components generated associated with the formation of the space S1 might become obvious as air bubbles b on each of a wall surface W1 and a wall surface W2 of the molten resin M facing the space S1. In that case, as shown in FIG. 9B, just by filling the space S1 with the molten resin M, the air bubbles b may remain as it is on a boundary surface W of the wall surface W1 and the wall surface W2, and the air bubbles b may be present in an injection-molded product as a defect in some cases. Consequently, bubble treatment is performed in which the air bubbles b are reduced or are again dissolved in the molten resin M to thereby be dispersed in the molten resin M by giving a pressure to the boundary surface W.

As the bubble treatment, two means of the following first bubble treatment and second bubble treatment are proposed.

Figure 9C:
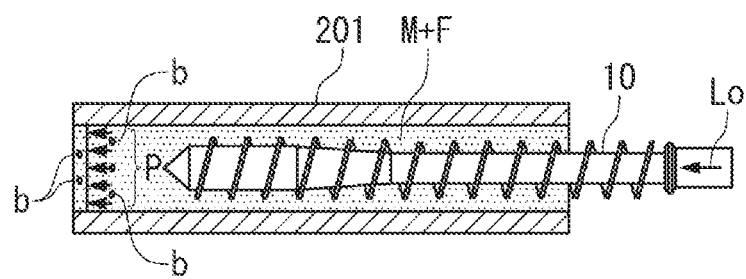

In the first bubble treatment, when it is detected that the space S1 has been filled with the molten resin M, a load in an advance direction is applied to the screw 10 as shown in FIG. 9C after the normal rotation of the screw 10 is stopped. Hereby, a pressure P is given to the boundary surface W of the wall surface W1 and the wall surface W2, the air bubbles b are made to be fine, and they are dispersed in the molten resin M. At this time, the load may just be applied at a predetermined advance velocity of the screw 10 and for a predetermined time, or until the load reaches a predetermined load Lo, or until an advance amount of the screw 10 reaches a predetermined value. After that, the second retreat is performed.

An advance velocity, a loading time, the load Lo, and the advance amount of the screw 10, which are loading conditions added to the screw 10, may be defined after degrees of effects obtained depending on the loading conditions are grasped by an experiment in advance. The same applies to a time or an angle for which or at which the screw 10 is rotated in the normal direction in the second bubble treatment, which will be mentioned later.

Figure 9D:
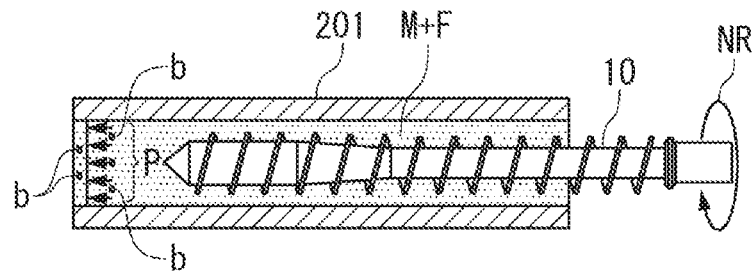

Next, in the second bubble treatment, when it is detected that the space S1 has been filled with the molten resin M, as shown in FIG. 9D, normal rotation NR of the screw 10 is performed to convey the molten resin M toward the downstream, and thereby the pressure P is given to the boundary surface W of the wall surface W1 and the wall surface W2. Hereby, the air bubbles b of the boundary surface W are reduced or are again dissolved in the molten resin, and they are dispersed in the molten resin M.

In the second bubble treatment, the screw 10 can be rotated in the normal direction with a position in the axial direction at which filling of the space S1 has been detected being maintained. In addition, the screw 10 can be rotated in the normal direction while being moved backward in the axial direction. Further, the screw 10 can also be rotated in the normal direction while the load Lo in the advance direction is added to the screw 10. Furthermore, the screw 10 can be rotated in the normal direction while being moved backward in the axial direction based on the pressure of the molten resin M, and the load Lo in the advance direction can also be added to the screw 10.

The first bubble treatment and the second bubble treatment are preferably performed whenever the comparatively small space S1 or space S2 is filled. Hereby, the pressure P can be given to the boundary surface W of the wall surface W1 and the wall surface W2 without the load applied by the advance of the screw 10 or the resin pressure by the normal rotation of the screw 10 being consumed for compression deformation of the molten resin M.

[Forcible Advance of Screw 10]

It is as mentioned above that forcible retreat is performed in order to generate the flow in the axial direction in the molten resin M in the screw groove 31. The flow is not generated only by the forcible retreat, and it is generated by occurrence of displacement in the axial direction between the screw 10 and the heating cylinder 201. Accordingly, even if the screw 10 is forcibly advanced, the flow in the axial direction can be generated in the molten resin M. Consequently, the embodiment proposes combining forcible advance with forcible retreat. Several patterns of the combination will be explained with reference to FIGS. 10A to 10H and FIGS. 11A to 11D.

Here, the pattern in which forcible advance is performed by the same stroke as forcible retreat will be explained with reference to FIGS. 10A to 10H. Note that the same operations as in FIGS. 3A and 3B in which the forcible retreat has been explained shall be performed in FIGS. 10A and 10B, and that a procedure after FIG. 10C different from FIGS. 3A and 3B will be explained.

After the forcible retreat (the first retreat FB1 in FIG. 10B) is performed, the screw 10 is forcibly advanced (hereinafter referred to as first advance FF1) by the stroke D1 with the normal rotation of the screw 10 being stopped. Hereby, as shown in FIG. 10C, the screw 10 returns to an original position, and the space S1 generated in the first retreat is occupied by the screw 10 and the molten resin M.

Next, the screw 10 is retreated to the first retreated position as shown in FIG. 10D while the molten resin M is conveyed toward the downstream by rotating (the first normal rotation NR1) the screw 10.

Next, the screw 10 is forcibly retreated (the second retreat FB2) by the stroke D1 as shown in FIG. 10E, and subsequently, it is forcibly advanced (second advance FF2) by the stroke D1 as shown in FIG. 10F.

Next, the screw 10 is retreated to the second retreated position as shown in FIG. 10G while the molten resin M is conveyed toward the downstream by rotating (the second normal rotation NR2) the screw 10. The second retreated position coincides with the position (the measurement position) of the screw 10 at which the amount of the molten resin M necessary for one shot is measured. That is, in the embodiment, the screw 10 is retreated to the measurement position by performing two-time forcible retreat and two-time forcible advance by an equal stroke. At this time, there is no trouble if the screw 10 is retreated by different strokes in the first retreat and the second retreat. Hereafter, the injection process of advancing the screw 10 is performed as shown in FIG. 10H.

According to the embodiment accompanied by the forcible advance, the following effects are exerted.

Figures 11A, 11B, 11C, 11D:
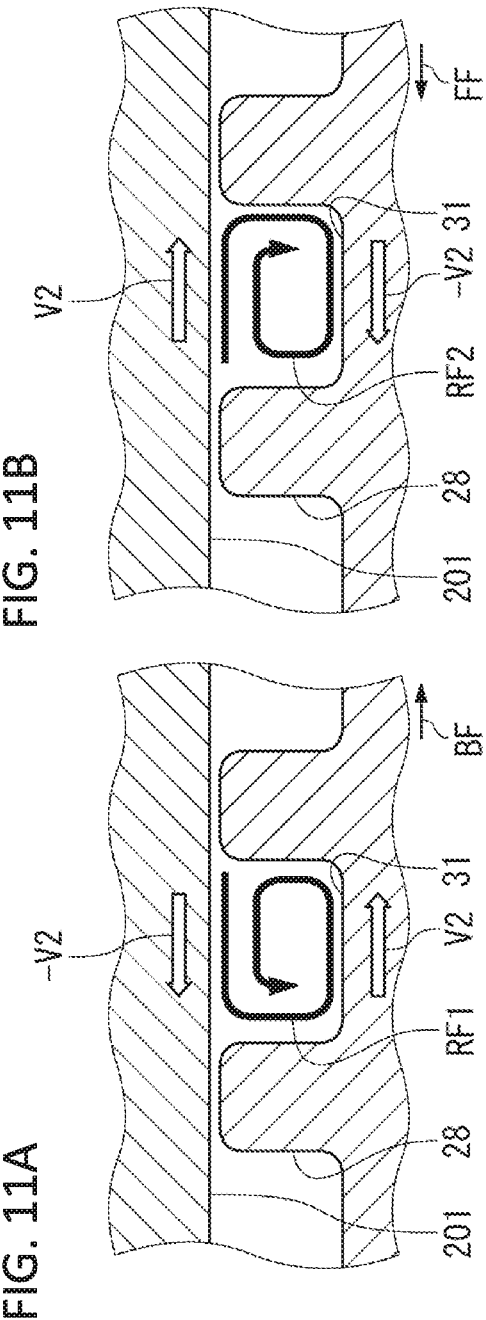
FIGS. 11A to 11D In the plasticizing process of FIGS. 10A to 10H.

That is, while the forcible retreat and the forcible advance are performed, the swirling flows RF1 and RF2 of the molten resin M having directions opposite to each other are generated as shown in FIGS. 11A and 11B. Consequently, according to the embodiment in which the forcible advance is performed, the shear force T2 by the forcible retreat and a shear force T3 having a direction opposite to the shear force T2 can be made to act on the reinforcing fibers F as shown in FIGS. 11C and 11D. Hereby, opening of the reinforcing fibers F can be promoted by the synergetic effect due to a fact that the reinforcing fibers F are changed in phase, is subjected to the shear forces in the different directions, and is stirred while the fiber bundle is loosened not by the shear force in one direction but by the shear forces in the respective directions.

Figure 12A:
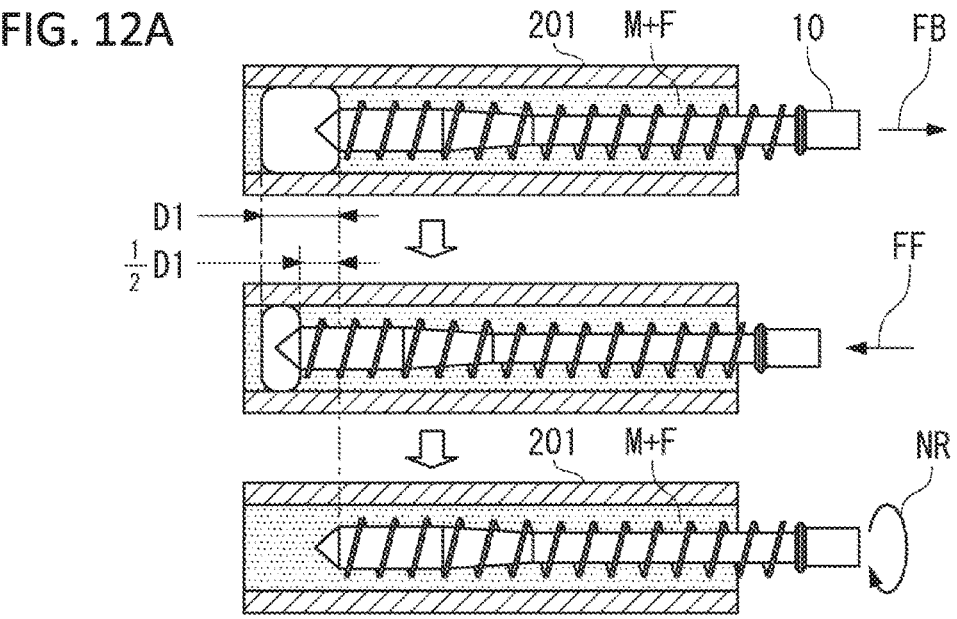
FIGS. 12A and 12B are views showing the other procedures of the plasticizing process in which the forcible advance is combined with the forcible retreat.

Although in the above, there has been shown an example in which the strokes of the forcible retreat and the forcible advance are set to be the same as each other, the present invention can reduce the stroke or the time of the forcible advance more than the forcible retreat. For example, as shown in FIG. 12A, when the stroke of the forcible retreat FB is set to be D1, the stroke of forcible advance FF can be, for example, set to be ½×D1. In addition, after the stroke of the forcible retreat FB is retreated by D1, it can be continuously or intermittently performed that the stroke of the forcible advance FF is advanced by ½×D1, and that the forcible retreat FB is again performed by the stroke D1. In addition, in performing forcible advance by the predetermined stroke D1, the stroke D1 can be divided to thereby intermittently advance the screw 10, for example, the screw 10 is advanced, stopped, advanced, stopped, and so on by ⅓×D1. In addition, each of distances obtained by dividing the stroke D1 in the intermittent forcible advance may be a uniform one, or a part or all of them may be different. In addition, each of advance velocities in the intermittent forcible advance may be a uniform one, or a part or all of them may be different (multi-stage velocity).

In addition, forcible advance may be performed until the load detected by the load cell, i.e. the pressure of the molten resin M reaches a predetermined value. According to that, when the screw 10 is advanced to a position before forcible retreat by forcible advance in a state where the molten resin M inside the screw 10 flows into the space S2 at the time of the forcible retreat, an amount of the molten resin M stored in front of the screw 10 is increased more after the forcible retreat than before, and the wall surface W1 of the molten resin is moved to a screw side or the wall surface W2 is moved to a wall surface W1 side, the moved wall surface W1 and wall surface W2 are further pushed in after abutment, the molten resin M stored in front of the screw 10 is excessively compressed to have a high pressure, and molding quality can be prevented from becoming unstable due to fluctuation of a density of the molten resin M etc. In addition, after the screw 10 is retreated while a usual plasticizing back pressure is applied, and the position of the screw 10 reaches a predetermined position before it reaches a measurement completion position, or the measurement completion position, forcible retreat and forcible advance may be alternately repeated. At this time, in a case where forcible advance and forcible retreat are performed from a predetermined position before the position of the screw 10 reaches the measurement completion position, the screw 10 may be retreated while the usual plasticizing back pressure is again applied after the forcible retreat or the forcible advance. In addition, in a case where forcible advance and forcible retreat are performed after the position of the screw 10 reaches the measurement completion position, the position of the screw 10 may be returned to the measurement completion position by the forcible advance at the end to then complete a measurement process.

Figure 12B:
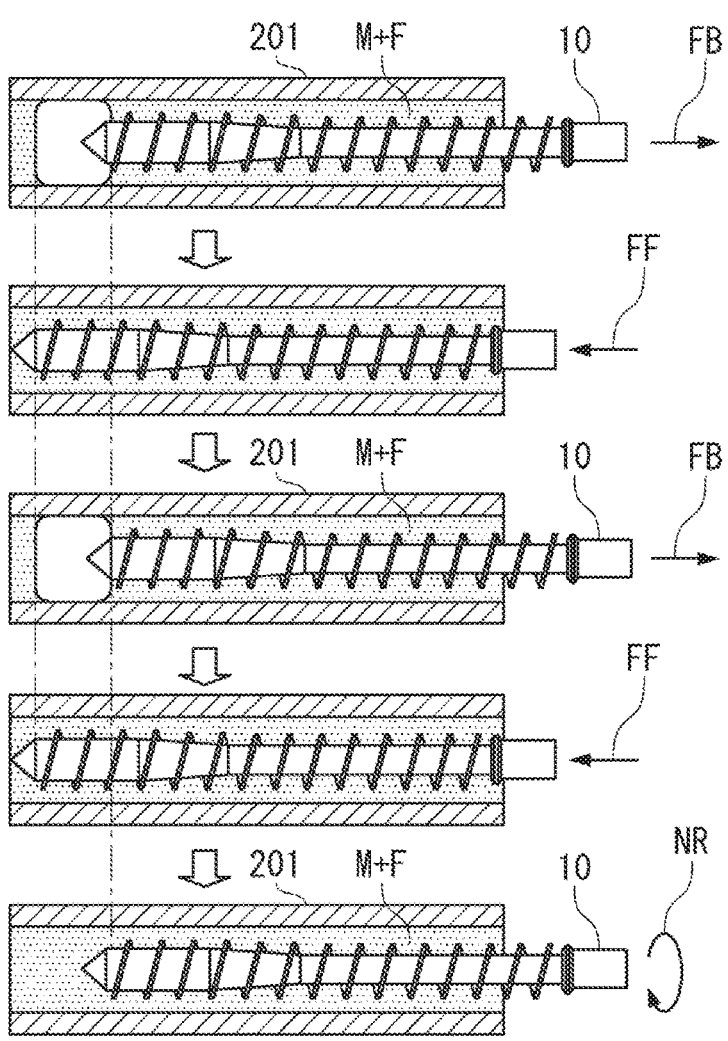

In addition, in the above explanation, the screw 10 transitions to the first normal rotation after performing the first advance subsequent to the first retreat, and also transitions to the second normal rotation after performing the second advance subsequent to the second retreat, and the forcible retreat and the forcible advance are performed only once, respectively before the normal rotation. However, in the present invention, for example, as shown in FIG. 12B, the forcible retreat and the forcible advance can also be repeated a plurality of times, such as the forcible retreat FB, the forcible advance FF, the forcible retreat FB, and the forcible advance FF, or the forcible retreat FB, the forcible advance FF, and the normal rotation of the screw 10 may be arbitrarily combined, such as the screw 10 is rotated in the normal direction so that the space S1 or the space S2 is filled, after the forcible retreat FB is again performed after the forcible retreat FB and the forcible advance FF are performed although not shown. In these cases as well, the stroke or the time of the forcible advance can be reduced more than the stroke or the time of the forcible retreat.

An experiment to confirm the effects of the embodiment was performed.

Figure 15:
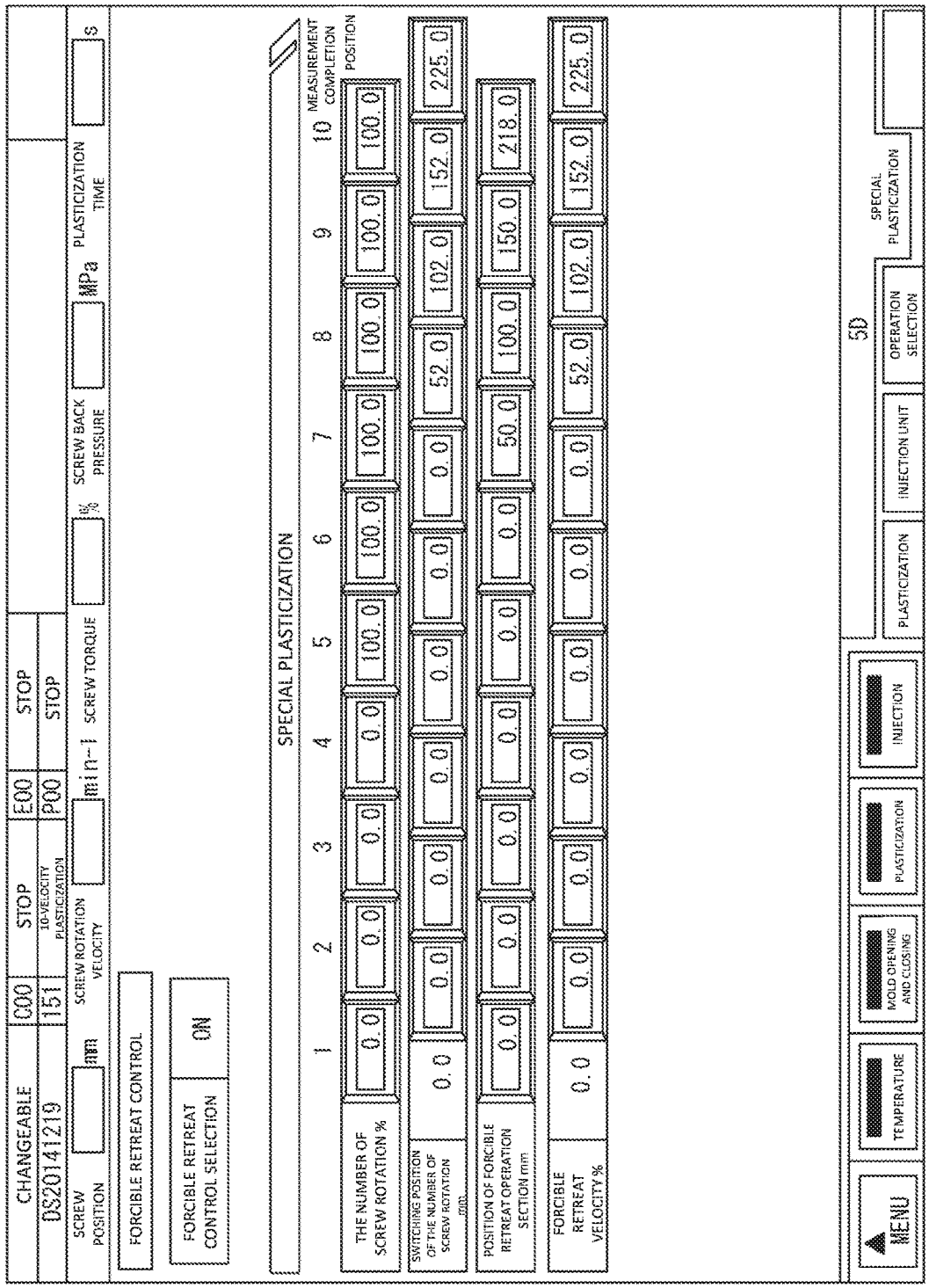
FIG. 15 is an illustration showing a screw retreat velocity setting screen, which is a man-machine interface of a control device of an injection molding machine used for the experiment to confirm the effects of the embodiment.

In FIG. 15, there is shown a screw retreat velocity setting screen, which is a man-machine interface of a control device of an injection molding machine used for the experiment. On the screen, there are arranged: a retreat velocity setting part to which an operation velocity of forcible retreat can be input with an arbitrary value; and a plurality of retreat operation section setting parts that set a switching position for setting an operation section of an operation of the forcible retreat. The retreat velocity setting part and the retreat operation section setting part are provided so that a molding worker can compare with a measurement completion screw position for measuring the other plasticization conditions (a set value and an execution value), particularly an amount of molten resin with which a mold is filled, by retreat of the screw. On the screen, the plurality of retreat velocity setting parts are provided by arrangement corresponding to each retreat operation section so as to be able to set a retreat velocity for each plurality of retreat operation sections, respectively. Meanwhile, in a case the retreat velocity is kept constant without being switched on position reference, only one retreat velocity setting part may be arranged. In addition, although in FIG. 15, the retreat velocity setting part and the retreat operation section setting part are arranged in a screen (a plasticizing condition setting screen) to set plasticizing conditions, they may be provided on a screen other than the plasticizing condition setting screen or another input device provided at a different portion. In addition, a change-over switch may be provided that switches control to measure an amount of molten resin with which a mold is filled by performing forcible retreat, and control to measure the amount of the molten resin without performing the forcible retreat.

In addition, in the screw retreat velocity setting screen, operation condition setting parts of a raw resin feed device and a reinforcing fiber feed device may be arranged and provided so that set values of operation conditions of the devices can be compared with a set value of the retreat velocity and a set value of the retreat operation section.

In addition, FIG. 15 shows the screen in which the worker can individually set each retreat operation section, respectively. However, in a case where each retreat operation section may be equal in a case where the retreat operation and the screw rotation operation are alternately performed by return, or in a case where each retreat operation section may be distributed at a pattern or ratio determined in advance, it may be set that each retreat operation section can be automatically calculated and set only by the worker inputting the number of divisions. In addition, an acceleration setting part to which acceleration of the retreat operation can be input with an arbitrary value may be provided on the screen.

Figure 13A:
FIGS. 13A and 13B are illustrations showing results of an experiment to confirm effects of the embodiment.
Figure 13B:
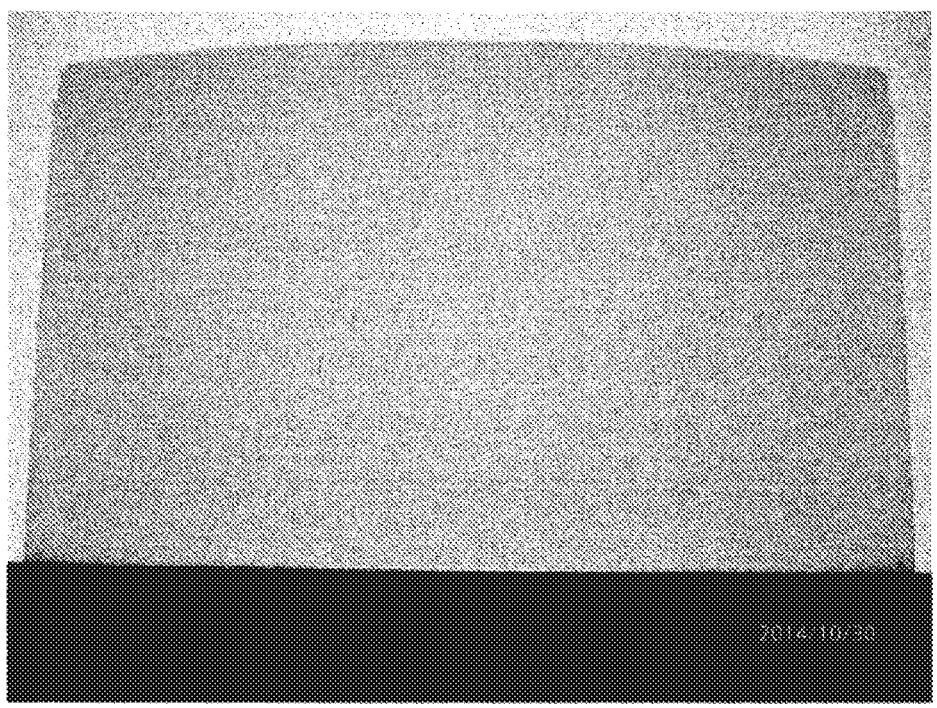

Results of the experiment are shown in FIGS. 13A and 13B. Note that FIG. 13A shows a surface of fiber reinforced resin (a conventional example) molded without performing forcible retreat, and that FIG. 13B shows a surface of fiber reinforced resin (an example) molded by performing forcible retreat in the pattern shown in FIGS. 3A to 3F.

As shown in FIG. 13A, in the conventional example, a lot of reinforcing fibers F, each of which is in a state of a bundle, are present, which appear on a surface of a molded product as black points. In contrast with this, as shown in FIG. 13B, in the example, since the reinforcing fibers F of poor opening, each of which is in the state of the bundle, are hardly present, the black points as in the conventional example have not appeared on a surface.

In addition, in a case where a stroke of the forcible retreat was less than either smaller one of 0.1×D (mm) (D is a cylinder inner diameter) and 10 (mm), there was a case where opening of the reinforcing fibers F was insufficient. The reason is considered as follows. In the case where the stroke of the forcible retreat was less than either smaller one of 0.1×D (mm) and 10 (mm), the reinforcing fibers F tangled in the screw groove could not be stretched by a sufficient distance, thus the reinforcing fibers F bent and deformed due to the tangle were only stretched and could not be pulled apart, and thus they could not be opened by breaking the tangle. From this, the stroke of the forcible retreat of the screw 10 is preferably not less than either smaller one of 0.1×D (mm) (D is the cylinder inner diameter) and 10 (mm). However, when the stroke of the forcible retreat is set to be large, the tangled reinforcing fibers F can be pulled apart by a sufficient distance, but a time required for the retreat becomes long. This leads to decrease in productivity since a time required for the plasticizing process, i.e. a time from start to completion of plasticization, becomes long. From this, the stroke of the forcible retreat is preferably not more than 2.0×D (mm). The same applied to each one-time retreat operation distance in the case of performing the retreat operation and the screw rotation operation are alternately repeated. Consequently, the stroke of the forcible retreat of the screw 10 is preferably not less than either smaller one of 0.1×D (mm) and 10 (mm), and further, it is preferably not more than 2.0×D (mm). More preferably, the stroke of the forcible retreat is not less than either smaller one of 0.2×D (mm) and 20 (mm), and it most preferably falls within a range not more than 1.5×D (mm).

In addition, it turned out that the effects of the present invention can be effectively obtained by the retreat velocity being not less than either smaller one of 5 (mm/s) and 0.05×D (mm/s) (D is the cylinder inner diameter). By the way, since the shear force applied from the molten resin M to the reinforcing fibers F is proportional to a product of the viscosity and the shear rate (a deformation velocity) of the molten resin M as it is well known, the larger a velocity applied to the molten resin M is, the larger a shear force acting on the reinforcing fibers F as an opening force becomes. The reason is considered as follows. In a case where the retreat velocity is less than either smaller one of 5 (mm/s) and 0.05×D (mm/s), a sufficient shear force cannot be applied to the reinforcing fibers F tangled in the screw groove, the fiber bundle cannot be loosened, a shear is just generated among the tangled fiber bundles or the fiber bundle is just softly deformed, and the reinforcing fibers F cannot be opened by breaking cohesiveness and tangle of the fiber bundle. In addition, from this, it is considered that setting the velocity (V2, −V2) of the swirling flow RF in the screw groove to be either smaller one of 5 (mm/s) and 0.05×D (mm/s) (D is the cylinder inner diameter) is effective for the opening of the reinforcing fibers F, since the velocity (V2, −V2) of the swirling flow RF is substantially the same as the screw retreat velocity.

In addition, in a case where acceleration of the retreat operation indicating a change degree of the shear rate was less than 5 (mm/s$^2$), there was a case where opening of the reinforcing fibers F was insufficient. The reason is considered as follows. Since the molten resin M is easily deformed in a case where change of the shear rate is slow, in a case where the acceleration of the retreat operation is as small as less than 5 (mm/s$^2$), the molten resin M that intervenes between the fiber bundles is slowly deformed, the shear force is consumed by the deformation of the molten resin M, and thus does not effectively work for the opening of the fiber bundle. From this, the acceleration of the retreat operation is preferably not less than 5 (mm/s$^2$). The acceleration of the retreat operation is further preferably not less than 50 (mm/s$^2$), and is further most preferably not less than 500 (mm/s$^2$). In a case where the retreat operation was performed at the acceleration not less than 500 (mm/s$^2$), poor opening of the reinforcing fibers F did not occur in any experimental conditions.

In addition, an acceleration distance of the retreat operation is preferably less than either smaller stroke of 0.1×D (mm) and 10 (mm). The reason is considered as follows. When the stroke not less than either smaller one of 0.1×D (mm) and 10 (mm) is needed for acceleration since a lower-limit value of a retreat stroke with which the effects of the present invention can be obtained is either smaller stroke of 0.1×D (mm) and 10 (mm) as mentioned above, a section in which the retreat operation is performed with a retreat velocity effective for the opening of the reinforcing fibers F is ended in a moment, and a level to satisfy molding quality required by a user may not be achieved depending on raw resin.

Hereinbefore, although the present invention has been explained based on the embodiment, it is possible to select a configuration exemplified in the above-described embodiment or to appropriately change the configuration to the other configuration, unless the configuration departs from the spirit of the present invention, For example, although four major forcible retreat patterns of basic forcible retreat, intermittent forcible retreat, bubble treatment, and forcible advance of the screw 10 have been shown as the pattern of the forcible retreat, forcible retreat may be performed combining the arbitrary plurality of forcible retreat patterns among them in arbitrary order.

In addition, the screw 10 of the injection molding machine to which the present invention is applied is not limited to a two-stage type design shown in the embodiment, and it can be a three-stage type design further including a third stage on a downstream side of the second stage, the third stage including a feed portion, a compression portion, and a measurement portion. In this case, such a function that adds a function member to the molten resin or deairs a volatile substance may be added to the third stage. In addition, the present invention can also be applied to a plasticizing unit of a type that feeds the resin pellet P and the reinforcing fibers F from the same hopper using the one-stage type screw 10 that has one feed portion, one compression portion, and one measurement portion.

In addition, the present invention can be applied to an injection molding machine called a preplasticizing system that individually includes a plasticizing device including a screw, and an injection device. The molding machine plasticizes the resin pellet P and the reinforcing fibers F by the plasticizing device, sends the plasticized resin into a plunger of the injection device, and subsequently advances the plunger to perform injection molding. The present invention can be applied to the plasticizing device of the injection molding machine of the preplasticizing system.

In the plasticizing unit 200 of the present invention, although the fiber feed device 213 and the resin feed hopper 207 are fixed to the heating cylinder 201, a movable hopper that moves in the axial direction of the screw 10 can be employed. Particularly in a case where a multiaxial type measurement feeder is used for the fiber feed device 213, a plurality of feeders may be parallelly coupled and arranged in the longitudinal direction of the screw 10, and the feeders that feed the reinforcing fibers F in the plasticizing process may be switched and used. Specifically, the reinforcing fibers F are fed from the feeder arranged at the tip side of the screw 10 at the time of start of the plasticizing process, and along with the retreat of the screw 10 in the plasticizing process, the feeder that feeds the reinforcing fibers F may be switched to the feeders of the back side one after the other so that a relative position of the screw 10 and a feeder screw from which the fibers are discharged is not changed. Hereby, a feed position of the reinforcing fibers F to the screw 10 can be set to be constant regardless of the change of the relative position of the heating cylinder 201 and the screw 10 due to the retreat of the screw 10 and the advance of the screw 10 at the time of injection.

Specifically, since a position of the fiber feed feeder screw at the time of plasticization completion, i.e. a position of the backmost screw groove filled with the reinforcing fibers F, can be made coincide with a position of the fiber feed feeder screw at the time of next plasticization start in a position of the screw advanced by the injection, the reinforcing fibers F can be continuously fed to the screw groove located closer to the downstream than the fiber feed device 213, and it is effective for preventing or suppressing generation of a region not filled with the reinforcing fibers F, the region being located in the groove of the screw 10 closer to the downstream than the fiber feed device 213.

In addition, as a way of switching the feeder screws, mere ON/OFF control may be performed, or the number of rotation of adjacent screw feeders may be changed in cooperation. Specifically, the number of rotation of the screw feeders of the downstream side is gradually reduced along with the retreat of the screw, and the number of rotation of the screw feeders of the back side may be increased gradually.

In addition, feed of the reinforcing fibers F to the heating cylinder 201 may be performed not only in the injection process and the plasticizing process, but may also be, for example, performed in a dwelling process and an injection standby process (a period from completion of the plasticizing process to start of the injection process). Since the screw 10 does not perform rotation, and advance or retreat during the dwelling process and the injection standby process, the vent hole is not intermittently blocked by movement of the flights. For this reason, the reinforcing fibers can be stably fed in the groove of the screw 10.

In addition, not only the reinforcing fibers F but the reinforcing fibers F with which powdery or pellet-type raw resin has been mixed may be fed to the fiber feed device 213. In this case, even though the molten resin M cannot easily infiltrate between the reinforcing fibers F, the mixed raw resin is melted in the bundle of the reinforcing fibers F, enters the inside of the fiber bundle, and can promote loosening of the fiber bundle.

In addition, resin and reinforcing fibers applied to the present invention are not particularly limited, and well-known materials are widely encompassed, such as: general-purpose resin, such as polypropylene and polyethylene; well-known resin such as engineering plastics, such as polyamide and polycarbonate; and well-known reinforcing fibers, such as glass fibers, carbon fibers, bamboo fibers, and hemp fibers. Note that in order to remarkably obtain the effects of the present invention, fiber reinforced resin with a high content rate of reinforcing fibers, i.e. a content rate not less than 10%, is preferably employed as a target. However, since conveyance resistance of the reinforcing fibers in the screw groove becomes large when the content rate of the reinforcing fibers exceeds 70%, it becomes difficult to convey the reinforcing fibers in the present invention using the small-diameter flights with relatively low conveyance capacity of resin, and the reinforcing fibers might block the inside of the screw groove to generate vent-up in the vent hole portion. For this reason, the content rate of the reinforcing fibers applied to the present invention is preferably 10 to 70%, and is more preferably 15 to 50%.

In addition, the effects of the present invention can be remarkably obtained particularly in molding using reinforcing fibers with a fiber length not less than 6 mm. Moreover, the effects of the present invention can be remarkably obtained in molding using chopped fibers or roving fibers with a fiber length not less than 9 mm.

In addition, in the present invention, additive components that improves quality and value of a molded product by being uniformly dispersed in the molten resin M, such as an additive agent and a filling material, may be applied instead of reinforcing fibers as the additive components, or by being combined with the reinforcing fibers or a resin raw material. For example, in a case where the resin raw material is fed from the feed hole of the upstream side of the heating cylinder, and the reinforcing fibers are fed from the feed hole of the downstream side thereof, an additive agent and/or a filling material may be fed instead of the reinforcing fibers or together with the reinforcing fibers from the feed hole of the downstream side, or the additive agent and/or the filling material may be fed together with the resin raw material from the feed hole of the upstream side of the heating cylinder, and the reinforcing fibers may be fed from the feed hole of the downstream side thereof. In addition, in a case where the reinforcing fibers and the resin raw material are fed from the same feed hole of the heating cylinder, the additive agent and/or the filling material may be fed to the heating cylinder instead of the reinforcing fibers or together with the reinforcing fibers, or the additive agent and/or the filling material may be fed to the heating cylinder through the both feed holes of the upstream side and the downstream side. In addition, these are appropriately combined, and the additive agent and the filling material may be fed to the heating cylinder, for example, the additive agent is fed from the feed hole of the upstream side, and the filling material is fed to the heating cylinder from the feed hole of the downstream side.

As additive agents of the present invention, there are included an additive agent that gives moldability and thermal stability when thermoplastic resin is molded, and an additive agent that improves durability under an environment where a thermoplastic resin molded product is used. Specifically, the following additive agents are included: a stabilizer (an antioxidant, a thermal degradation inhibitor, or a hydrolysis inhibitor); a light stabilizer; a UV absorber; a lubricant; a mold lubricant; a plasticizer; a slidability improver; a flame retardant; a foaming agent; an antistatic agent; a dispersing agent; a nucleating agent; a colorant; etc., and one or more kinds of these additive agents can be mixed and used.

In addition, as filling materials of the present invention, there are included filling materials for improving various characteristics, such as strength, rigidity, and heat resistance of the thermoplastic resin molded product, and they are usually used. Specifically, the following filling materials are exemplified: glass-based reinforcing agents, such as glass beads, glass flakes, and glass balloons; silicate-based reinforcing agents, such as talc, clay, mica, wollastonite, montmorillonite, magnesium silicate, and aluminum silicate; sulfate-based reinforcing agents, such as barium sulfate; carbonate-based reinforcing agents, such as calcium carbonate, magnesium carbonate, and zinc carbonate; hydroxide reinforcing agents, such as aluminum hydroxide, magnesium hydroxide, and calcium hydroxide; oxide reinforcing agents, such as silica, alumina, titanium oxide, antimony oxide, zinc oxide, magnesium oxide, calcium oxide, and silicon oxide; carbon-based reinforcing agents, such as carbon black, graphite, and carbon fibers; metal-based reinforcing agents, such as aluminum, copper, iron, boron, stainless fibers, powder, and flakes; silicon carbide; boron nitride; a potassium titanate whisker; an aluminum borate whisker; a coupling agent; an acid-modified resin binder agent; a rubber component; etc. In the present invention, one or more kinds of these filling materials can be mixed and used. In addition, particularly, in a case where the resin raw material is fed from the feed hole of the upstream side of the heating cylinder, and the additive components are fed from the feed hole of the downstream side thereof, a time for the additive components to receive heat in the screw groove can be reduced, and thus even additive components with low heat resistance, such as wood pulp, wastepaper, used paper, and wool can be uniformly dispersed in the molten resin while thermal degradation is suppressed.

REFERENCE SIGNS LIST 1 injection molding machine
10 screw
21 first stage
22 second stage
23 feed portion
24 compression portion
25 feed portion
26 compression portion
27 first flight
28 second flight
28A side surface
28B side surface
31 screw groove
31A bottom surface
50 control unit
70 measurement portion
71 measurement portion
100 mold clamping unit
101 base frame
103 fixed mold
105 fixed die plate
107 slide member
109 movable mold
111 movable die plate
113 hydraulic cylinder
115 tie bar 117 hydraulic cylinder
119 ram
121 male screw portion
123 nut
200 plasticizing unit
201 heating cylinder
201A inner wall surface
203 discharge nozzle
206 vent hole
207 resin feed hopper
208 feed hole
209 first electric motor
211 second electric motor
213 fiber feed device
214 biaxial type screw feeder
215 pellet feed device
218 roving cutter
300 screw
301 screw groove
303 pull side
305 push side
306 flight
310 cylinder
F reinforcing fibers
M molten resin
b air bubbles
P resin pellet
S1 space
S2 space
W1 wall surface
W2 wall surface
W boundary surface

The invention claimed is:

1. An injection molding method of resin containing reinforcing fibers, comprising:
a plasticizing process of feeding a fiber bundle and a resin raw material to a cylinder including a screw that can rotate around a rotation axis and can advance and retreat along the rotation axis, and generating molten resin by rotating the screw in a normal direction, the fiber bundle comprising the reinforcing fibers in a roving state or in a chopped strand state; and
an injection process of injecting to a cavity the molten resin containing the reinforcing fibers, wherein
in the plasticizing process;
a shear force in a direction different from a direction of a shear force generated by rotation of the screw is applied to the fiber bundle contained in the molten resin inside a groove of the screw by a retreat operation of forcibly retreating the screw for a predetermined stroke or for a predetermined time that can form a space in which the molten resin is not present, the space being formed at a side away from the screw, so that a swirling flow is generated in the molten resin containing the reinforcing fibers in a rotation axis direction of the screw; and
in the plasticizing process;
the retreat operation is performed after a cylinder downstream side of the screw is filled with the molten resin, and a rotation operation of rotating the screw in the normal direction is performed after the retreat operation, so that dispersion of the reinforcing fibers is promoted, wherein the rotation of the screw is stopped during the retreat operation.

2. An injection molding method of resin containing reinforcing fibers, comprising:
a plasticizing process of feeding a fiber bundle and a resin raw material to a cylinder including a screw that can rotate around a rotation axis and can advance and retreat along the rotation axis, and generating molten resin by rotating the screw in a normal direction, the fiber bundle comprising the reinforcing fibers in a roving state or in a chopped strand state; and
an injection process of injecting to a cavity the molten resin containing the reinforcing fibers, wherein
in the plasticizing process;
a shear force in a direction different from a direction of a shear force generated by rotation of the screw is applied to the fiber bundle contained in the molten resin inside a groove of the screw by a retreat operation of forcibly retreating the screw for a predetermined stroke or for a predetermined time that can form a space in which the molten resin is not present, the space being formed at a side away from the screw, so that a swirling flow is generated in the molten resin containing the reinforcing fibers in a rotation axis direction of the screw; and
in the plasticizing process;
the retreat operation is performed after a cylinder downstream side of the screw is filled with the molten resin, and a rotation operation of rotating the screw in the normal direction is performed after the retreat operation, so that dispersion of the reinforcing fibers is promoted,
wherein the retreat operation includes a first retreat operation and a second retreat operation, the space in which the molten resin is not present is formed by performing the first retreat operation, and the second retreat operation is performed after it is detected that the space has been filled with the molten resin by performing the rotation operation.

3. An injection molding method of resin containing reinforcing fibers, comprising:
a plasticizing process including a feeding operation of feeding a fiber bundle and a resin raw material to a cylinder including a screw that can rotate around a rotation axis and can advance the fiber bundle and the resin raw material along the rotation axis, and generating molten resin by rotating the screw in a normal direction, the fiber bundle comprising the reinforcing fibers in a roving state or in a chopped strand state;
a retreat operation of forcibly retreating the screw for a predetermined stroke or for a predetermined time so that a shear force in a direction different from a direction of a shear force generated by rotation of the screw in the feeding operation is applied to the fiber bundle contained in the molten resin inside a groove of the screw by retreating the screw, the retreat operation forming a space in which the molten resin is not present, the space being formed at a side away from the screw, the space being formed in an expanded manner by a lower pressure than an inside of the molten resin and the space being created by leakage of gas components containing a volatile component, so that a swirling flow is generated in the molten resin containing the reinforcing fibers in a rotation axis direction of the screw; and
a rotation operation of rotating the screw in the normal direction to convey the molten resin to a downstream side to compress the space with the molten resin so that dispersion of the reinforcing fibers is promoted, and
an injection process of injecting to a cavity the molten resin containing the reinforcing fibers.

4. The injection molding method according to claim 3, wherein the resin raw material is fed from an upstream side of the cylinder and the fiber bundle is fed from a downstream side of the cylinder.

5. The injection molding method according to claim 3, wherein the fiber bundle and the resin raw material are fed from the same feed hole of the cylinder.

6. The injection molding method according to claim 3, wherein the shear forces include a shear force T2 along the rotation axis direction of the screw and a shear force T1 along a peripheral direction perpendicular to the rotation axis direction.

7. The injection molding method according to claim 6, wherein in the retreat operation, the screw is forcibly retreated continuously or intermittently by diving the predetermined stroke or the predetermined time.

8. The injection molding method according to claim 3, wherein the retreat operation and the rotation operation are alternately repeated.

9. The injection molding method according to claim 8, wherein the retreat operation includes a first retreat operation and a second retreat operation, the space in which the molten resin is not present is formed by performing the first retreat operation, and the second retreat operation is performed after it is detected that the space has been filled with the molten resin by performing the rotation operation.

10. The injection molding method according to claim 9, wherein a force in an advance direction is applied to the screw after the space is filled with the molten resin to thereby apply the force in the advance direction to the molten resin.

11. The injection molding method according to claim 10, wherein the force in the advance direction is applied by rotating the screw in the normal direction to thereby convey the molten resin in the advance direction.

12. The injection molding method according to claim 8, wherein the retreat operation includes a first retreat operation, the space in which the molten resin is not present is formed by performing the first retreat operation, and a force in an advance direction is applied to the molten resin after it is detected that the space has been filled with the molten resin by performing the rotation operation.

13. The injection molding method according to claim 3, wherein the rotation operation is a rotation operation of rotating the screw while a position of the screw in a direction of the rotation axis is maintained, or the screw is advanced.

14. The injection molding method according to claim 3, wherein in the plasticizing process, the retreat operation is performed, and an advance operation of forcibly advancing the screw is performed by a predetermined stroke or a predetermined time, or until it is detected that a pressure of the molten resin has reached a predetermined pressure, after the retreat operation is performed.

15. The injection molding method according to claim 14, wherein in the plasticizing process, a rotation operation of rotating the screw in the normal direction is performed after the advance operation.

16. The injection molding method according to claim 3, wherein a fiber length of the reinforcing fibers is not less than 3 mm.

17. The injection molding method according to claim 3, wherein, after the retreat operation, the rotation operation is performed under a condition where a back pressure cannot be controlled to be a desired back pressure value.

* * * * *